United States Patent
Saulnier et al.

(10) Patent No.: US 9,331,879 B2
(45) Date of Patent: May 3, 2016

(54) MULTI-CHANNEL THROUGH-WALL COMMUNICATION SYSTEM USING CROSSTALK SUPPRESSION

(71) Applicant: RENSSELAER POLYTECHNIC INSTITUTE, Troy, NY (US)

(72) Inventors: Gary J. Saulnier, East Greenbush, NY (US); Jonathan D. Ashdown, Greenwich, NY (US); Tristan J. Lawry, East Lyme, CT (US); Kyle R. Wilt, Sand Lake, NY (US); Henry A. Scarton, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 14/385,964

(22) PCT Filed: Feb. 6, 2013

(86) PCT No.: PCT/US2013/024889
§ 371 (c)(1),
(2) Date: Sep. 17, 2014

(87) PCT Pub. No.: WO2013/147999
PCT Pub. Date: Oct. 3, 2013

(65) Prior Publication Data
US 2015/0085949 A1    Mar. 26, 2015

Related U.S. Application Data

(60) Provisional application No. 61/686,116, filed on Mar. 30, 2012.

(51) Int. Cl.
*H04B 15/00* (2006.01)
*H04L 27/26* (2006.01)
(Continued)

(52) U.S. Cl.
CPC .......... *H04L 27/2601* (2013.01); *H04B 7/0413* (2013.01); *H04B 7/068* (2013.01); *H04B 7/0854* (2013.01); *H04B 11/00* (2013.01); *H04L 25/08* (2013.01)

(58) Field of Classification Search
CPC .......... H04B 3/32; H04B 3/23; H04B 7/0413; H04B 11/00; H04B 7/068; H04B 7/0854; H04L 25/03343; H04L 25/08; H04L 27/2601
USPC ......................................................... 375/285
See application file for complete search history.

(56) References Cited

U.S. PATENT DOCUMENTS 5,539,832 A    7/1996    Weinstein et al.
5,982,297 A    11/1999   Welle
(Continued)

OTHER PUBLICATIONS

Lawry, T.J.; Saulnier, G.J.; Ashdown, J.D.; Wilt, K.R.; Scarton, H.A.; Pascarelle, S.; Pinezich, J.D.; "Penetration-free system for transmission of data and power through solid metal barriers," 2011 Military Communications Conference, MILCOM 2011, pp. 389-395.*

(Continued)

*Primary Examiner* — Nader Bolourchi
(74) *Attorney, Agent, or Firm* — Notaro, Michalos & Zaccaria P.C.

(57) ABSTRACT

A system for communicating through a solid wall uses piezoelectric transducers in a multiple-input multiple-output configuration and applies crosstalk suppression. Methods of suppressing or avoiding crosstalk between parallel communication channels includes zero-forcing, eigenmode transmission, and least mean squared error processing. Orthogonal frequency division multiplexing can be used to increase transmission rates using many subchannels. Bit-loading can be used to maximize system performance.

25 Claims, 26 Drawing Sheets

(51) Int. Cl.
*H04B 7/04* (2006.01)
*H04B 7/06* (2006.01)
*H04B 7/08* (2006.01)
*H04L 25/08* (2006.01)
*H04B 11/00* (2006.01)

(56) References Cited

U.S. PATENT DOCUMENTS

| | | |
|---|---|---|
| 6,037,704 A | 3/2000 | Welle |
| 6,127,942 A | 10/2000 | Welle |
| 6,470,996 B1 | 10/2002 | Kyle et al. |
| 6,625,084 B1 | 9/2003 | Payton |
| 6,639,872 B1 | 10/2003 | Rein |
| 6,826,965 B1 | 12/2004 | Liu |
| 6,951,133 B2 | 10/2005 | Passarelli, Jr. |
| 7,167,606 B2 | 1/2007 | Gunn, III |
| 7,514,844 B2 | 4/2009 | Unkrich |
| 7,525,398 B2 | 4/2009 | Nishimura et al. |
| 7,586,392 B2 | 9/2009 | Unkrich |
| 7,894,306 B2 | 2/2011 | Bagshaw et al. |
| 7,902,943 B2 | 3/2011 | Sherrit et al. |
| 8,605,548 B2 | 12/2013 | Froelich |
| 9,054,826 B2 | 6/2015 | Lawry et al. |
| 2002/0122464 A1 | 9/2002 | Dodge |
| 2010/0027379 A1 | 2/2010 | Saulnier et al. |
| 2015/0034305 A1 | 2/2015 | Tips |

OTHER PUBLICATIONS

Hai Yan ; Shengli Zhou ; Zhijie Shi ; Jun-Hong Cui ; Lei Wan; Jie Huang ; Hao Zhou; "DSP implementation of SISO and MIMO OFDM acoustic modems," Oceans 2010 IEEE—Sydney, 2010 , pp. 1-6.*

Bielinski, M.; Wanuga, K.; Primerano, R.; Kam, Moshe; Dandekar, K.R.; "Application of Adaptive OFDM Bit Loading for High Data Rate Through-Metal Communication," 2011 IEEE Global Telecommunications Conference (GLOBECOM 2011), Issue Date: Dec. 5-9, 2011, pp. 1-5.*

Liang Sun ; McKay, M.R.; "Eigen-Based Transceivers for the MIMO Broadcast Channel With Semi-Orthogonal User Selection," IEEE Transactions on Signal Processing, vol. 58 , Issue: 10, 2010 , pp. 5246-526.*

Frigon, J. F. ; Daneshrad, B.; "Interpolation Techniques for MIMO OFDM with Interference Cancellation," IEEE 16th International Symposium on Personal, Indoor and Mobile Radio Communications (PIMRC 2005) in vol. 1, 2005 , pp. 206-210.*

\* cited by examiner

Conceptual elements of channel gain matrix H for 2X2 MIMO

Zero-forcing interference cancelation structure

Eigenmode transmission structure

Least mean square interference structure for 2X2 MIMO case

2x2 MIMO 4 MHz acoustic-electric channel: bit-loading performance comparisons (No Crosstalk)

Fig. 23  2x2 MIMO 4 MHz acoustic-electric channel: bit-loading performance comparisons (No Crosstalk Suppression)

2x2 MIMO 4 MHz acoustic-electric channel: bit-loading performance comparisons (Zero Forcing)

Fig. 26    2x2 MIMO 4 MHz acoustic-electric channel: bit-loading performance comparisons (MMSE)

7x7 MIMO 4 MHz acoustic-electric channel:
bit-loading performance comparisons (No Crosstalk)

Fig. 28   7x7 MIMO 4 MHz acoustic-electric channel: bit-loading performance comparisons (No Crosstalk Suppression)

Fig. 29   7x7 MIMO 4 MHz acoustic-electric channel: bit-loading performance comparisons (Zero Forcing)

7x7 MIMO 4 MHz acoustic-electric channel: bit-loading performance comparisons (Eigenmode)

7x7 MIMO 4 MHz acoustic-electric channel: bit-loading performance comparisons (MMSE)

MULTI-CHANNEL THROUGH-WALL COMMUNICATION SYSTEM USING CROSSTALK SUPPRESSION

CROSS-REFERENCE TO PRIORITY APPLICATION

Applicants hereby claim the benefit of, and incorporate by reference as if restated fully herein, U.S. Provisional Patent Application No. 61/686,116.

FIELD AND BACKGROUND OF THE INVENTION

The present invention relates generally to the field of transducer communication through walls, and in particular to simultaneous use of multiple pairs of transducers to communicate via multiple channels through a single wall, and to suppressing interfering cross-talk between non-paired transducers.

A transducer is a device that converts one form of energy to another. Transducers may be used, among other functions, to transmit and receive data and power across a solid barrier without requiring any holes in the barrier. Conceptually, this can be done by a first transducer on one side of a barrier turning electrical energy into mechanical energy, the mechanical energy traveling across the barrier, and being received by a second transducer on the other side of the wall which converts some portion of the mechanical energy back into electrical energy. This ability is particularly useful for transmitting energy and data through barriers like ship and submarine hulls, pressure vessel tanks, and other walls separating extreme environments where it is undesirable to create physical openings for wires.

Ideally, transducer devices should be attached directly to the communications barrier, though many arrangements are possible. It is generally desirable to have a smooth, uninterrupted, uniform barrier between coupled transducers.

When two or more closely spaced pairs of axially aligned acoustic-electric (i.e. piezoelectric) transducers are mounted on opposite sides of a barrier or wall, undesired crosstalk occurs. This crosstalk occurs when signals sent by a first transducer on one side of the wall are received by transducers other than its intended mate on the other side of the wall. This crosstalk degrades signal processing between the aligned pairs.

Published patent application US2010/0027379, published Feb. 4, 2010 and incorporated herein by reference, discloses an ULTRASONIC THROUGH-WALL COMMUNICATION (UTWC) SYSTEM for communicating digital information through a barrier in the form of a thick metal wall, using ultrasonic techniques so that no through-holes are needed in the barrier. Using this system, signals can be transmitted through the barrier. For example, sensor signals that monitor conditions on one side of the barrier can be transmitted to the other side of the barrier. The barrier may be the wall of a pressure vessel and the conditions to be monitored may be those of a hostile, high temperature and high pressure, gaseous or liquid environment in the pressure vessel.

U.S. Pat. No. 7,902,943 to Sherrit et al. discloses a WIRELESS ACOUSTIC-ELECTRIC FEED-THROUGH FOR POWER AND SIGNAL TRANSMISSION including a first piezoelectric transducer to generate acoustic energy in response to electrical energy from a source, and a second piezoelectric transducer to convert the received acoustic energy to electrical energy to be used by a load.

U.S. Pat. No. 7,894,306 to Martin et al. for an APPARATUS AND METHOD FOR DATA TRANSFER THROUGH A SUBSTRATE discloses transferring data through a submarine hull or other solid boundary using high frequency acoustic signals to avoid penetration of the hull or boundary.

U.S. Pat. No. 5,982,297 to Welle discloses an ultrasonic data communication system including first and second transducers coupled together through a coupling medium for communicating input and output undulating pressure waves between the transducers for the transfer of input and output data between an external controller and an embedded sensory and actuating unit. An internal processor powers the second embedded transducer to generate ultrasonic waves into the medium that are modulated to send the data from the embedded sensor so that considerable energy is needed for the embedded circuits.

Also see U.S. Pat. Nos. 6,625,084; 6,639,872; 7,514,844; 7,525,398 and 7,586,392 for other approaches to the transmission of data or power through a barrier using ultrasound.

A more comprehensive approach to wireless data and power transmission through a barrier is taught by R. Primerano in "High Bit-rate Digital Communication through Metal Channels," PhD dissertation, Drexel University, July 2010, hereafter referred to as Primerano. Without conceding that Primerano is prior art to the invention disclosed in the present application, Primerano is interesting because it teaches Orthogonal Frequency-Division Multiplexing or OFDM modulation with a cyclic prefix to send data at a high rate through a metal wall using ultrasound. The use of OFDM compensates for signal loss due to echos caused by boundaries or due to other incongruities across the channel.

Using transducers to send vibrational signals through a wall presents special challenges. Unlike more traditional arrangements, completely separate channels, such as separate wires, cannot easily be provided to segregate communication between different components and in different directions between the same components, or even to segregate power transmission from signal transmission. In many cases all communications—in both directions—must be passed through the same solid wall between multiple pairs of transducers.

Despite the technical obstacles, it is sometimes desirable to use multiple pairs of transducers to create multiple communication channels in the same section of a barrier wall. In theory more pairs of transducers means that data can be transferred at a faster rate, though in practice neighboring transducers often interfere with each other. Reducing or filtering out this interfering noise is thus highly desirable.

Multicarrier modulation schemes, such as orthogonal frequency division multiplexing (OFDM), and multichannel techniques, such as multiple-input multiple-output (MIMO), enable high rate wireless communication for wireless air channels. OFDM is a powerful alternative to single carrier schemes for achieving high data rates on frequency selective channels without requiring highly complex equalization. See, for example, J. Mietzner, R. Schober, L. Lampe, W. Gerstacker, and P. Hoeher, "Multiple-antenna techniques for wireless communications—a comprehensive literature survey," Communications Surveys Tutorials, IEEE, April 2009; Y. Fu, C. Tellambura, and W. A. Krzymien, "Transmitter precoding for ICI reduction in closed-loop MIMO OFDM systems," Vehicular Technology, IEEE Transactions on, January 2007. MIMO techniques have come to the forefront in recent years, employing multiple transmitters and/or receivers to increase reliability or to increase throughput capabilities. In combination, MIMO and OFDM have proven extremely effective at achieving high data rates with high reliability on frequency selective dynamic air channels.

There are many applications in which it would be beneficial to communicate wirelessly through enclosed metallic vessels at high data rates. Wired solutions involve drilling holes for wires which can be costly and reduce structural integrity. While electromagnetic transmission techniques employing multicarrier and multichannel approaches have proven extremely effective in the case of wireless air channels, such techniques are historically ineffective for wireless communication through metallic barriers due to Faraday shielding. Several alternative solutions have been presented which utilize the favorable propagation characteristics of ultrasound in metals. Most of these solutions have employed a single acoustic channel consisting of a pair of ultrasonic transducers mounted on opposite sides of a metallic barrier. Several single carrier, single channel systems have been presented whose data rates have been limited by inter-symbol interference (ISI) caused by the frequency selective channel. See, for example, G. J. Saulnier, H. A. Scarton, A. J. Gavens, D. A. Shoudy, T. L. Murphy, M. Wetzel, S. Bard, S. Roa-Prada, and P. Das, "Through-wall communication of low-rate digital data using ultrasound," in Ultrasonics Symposium, 2006. IEEE, October 2006; D. A. Shoudy, G. J. Saulnier, H. A. Scarton, P. K. Das, S. Roa-Prada, J. D. Ashdown, and A. J. Gavens, "An ultrasonic throughwall communication system with power harvesting," in Ultrasonics Symposium, 2007. IEEE, October 2007; R. Primerano, M. Kam, and K. Dandekar, "High bit rate ultrasonic communication through metal channels," in 43rd Annual Conference on Information Sciences and Systems, CISS, March 2009.

In the Applicants' previous work they have used multicarrier modulation on a single channel utilizing 4096 OFDM subcarriers and achieved 12.4 Mbps communication through a 63.5 mm (2.5 in) thick steel barrier with an estimated maximum single channel capacity of 48 Mbps. Without admitting or denying that any particular reference constitutes prior art, see T. J. Lawry, G. J. Saulnier, J. D. Ashdown, K. R. Wilt, H. A. Scarton, S. Pascarelle, and J. D. Pinezich, "Penetration-free system for transmission of data and power through solid metal barriers," in MILITARY COMMUNICATIONS CONFERENCE, 2011—MILCOM 2011, November 2011; T. Lawry, "A high performance system for wireless transmission of power and data through solid metal enclosures," Ph.D. dissertation, Rensselaer Polytechnic Institute, July 2011.

See also S. H. Ting, K. Sakaguchi, and K. Araki, "A robust and low complexity adaptive algorithm for MIMO eigenmode transmission system with experimental validation," Wireless Communications, IEEE Transactions on, July 2006.

U.S. Pat. No. 6,826,965 to Liu uses acoustics and crosstalk suppression in a measurement system that does not relate to communications. U.S. Pat. No. 5,539,832 to Weinstein et al. describes a technique for separating signals. U.S. Pat. No. 6,951,133 to Passarelli, Jr. Relates to non-destructive testing that seeks to find flaws in metallic structures. It describes electromagnetic transducers while this invention preferably uses piezoelectric transducers. U.S. Pat. No. 7,167,606 to Gunn, III et al. describes an optical waveguide. US 2002/0122464 to Dodge uses Walsh function amplitude modulation.

SUMMARY OF THE INVENTION

It is an object of the present invention to reduce losses caused by crosstalk between neighboring acoustic-electric channels so that aggregate MIMO capacity performance improves over that of any single channel used independently.

Accordingly, this invention provides methods for mitigating cross-talk, and the use of multiple communication channels which, in combination with crosstalk cancellation techniques, enable high-rate communication through thick metallic barriers or other media in which transducer communication techniques are ineffective. The rates that may be achieved using multiple channels with crosstalk suppression far exceed those achievable by a single channel alone.

The use of multiple-input and multiple-output (MIMO) parallel acoustic-electric channels with two or more pairs of coaxially aligned piezoelectric transducers can be enhanced by using orthogonal frequency division multiplexing (OFDM), which achieves high efficiency, but which suffers from crosstalk interference to the point where the advantages of MIMO are almost cancelled out.

To solve these problems, the invention comprises three general crosstalk mitigation embodiments, namely:
(1) zero forcing;
(2) eigenmode transmission; and
(3) minimum mean-square error (MMSE).

These techniques each reduce losses caused by crosstalk between the acoustic-electric channels so that aggregate MIMO capacity performance improves over that of any single channel used independently. In a relatively static MIMO acoustic-electric channel, i.e. a channel where the acoustic properties across the barrier do not change over time or due to environmental conditions like temperature and pressure, a minimal complexity adaptive approach such as the Least Mean Squares (LMS) algorithm may be used while achieving a similar capacity as more complex structures.

This disclosure presents the use of multiple communication channels to transmit data at high rates, without physical penetrations, through thick metallic barriers using ultrasound. Two or more parallel acoustic-electric channels are formed (in far or close proximity) utilizing two or more pairs of coaxially aligned piezoelectric transducers mounted on, and acoustically coupled to, opposing sides of a metal wall. Each channel employs orthogonal frequency division multiplexing (OFDM) which can achieve a high spectral efficiency in frequency selective channels. Several multiple-input multiple-output (MIMO) configurations are presented and analytical expressions of channel capacity are determined for the raw channels, as well as for several co-channel crosstalk cancellation techniques, and they are verified using a Monte-Carlo simulation. It is shown that excessive crosstalk between the channels results in marginal gains or, often times, losses in data rate performance over the single channel case when some type of crosstalk mitigation technique is not used. Several crosstalk mitigation structures, including zero forcing, eigenmode transmission, and minimum mean-square error (MMSE) are utilized to reduce the losses caused by the crosstalk between the acoustic-electric channels. It is shown that, through the use of multiple acoustic-electric channels coupled with crosstalk mitigation techniques, the aggregate MIMO capacity performance improves drastically over that of any single channel used independently. It is also determined that, in a relatively static MIMO acoustic-electric channel, a minimal complexity adaptive approach such as the Least Mean Squares (LMS) algorithm may be used while achieving a similar capacity to more complex structures.

In one embodiment of this invention, a method of sending signals through a barrier using multiple-input multiple-output (MIMO) channels comprising transducers and zero forcing crosstalk suppression includes steps of providing a barrier, the barrier having a transmitter assembly on a first side of the barrier and a receiver assembly on a second side of the barrier. The transmitter assembly comprises a plurality of transmit transducers coupled to the first side of the barrier, the receiver assembly comprises a plurality of receiver transducers coupled to the second side of the barrier, and equal numbers of transmit transducers and receiver transducers are provided. Each transmit transducer is paired with and axially aligned with a corresponding receiver transducer on the opposite side of the barrier.

A plurality of communication channels can communicate signals through the barrier, each communication channel comprising a portion of the barrier which is located between a pair of aligned transmit and receiver transducers, and the number of communication channels is the same as the number of transmit transducers and the number of receiver transducers. A plurality of the communication channels collectively form a MIMO signaling arrangement.

A preferred method includes sending a transmit signal from the first side of the barrier through at least one communication channel using at least one transmit transducer, receiving a receive signal vector at the receiver transducers, determining an approximate channel gain matrix H for the plurality of communication channels which are part of the MIMO signaling arrangement, and using zero forcing to cancel crosstalk within the MIMO signaling arrangement. The step of using zero forcing preferably comprises scaling the receive signal vector with the inverse of the channel gain matrix H.

The method may also include sending a transmit signal from the first side of the barrier through the communication channels using orthogonal frequency division multiplexing (OFDM) wherein using OFDM comprises sending signals on a plurality of subcarriers.

The process of determining a channel gain matrix H may include the steps of: the transmitter assembly transmitting known symbols on each subcarrier, and the receiver assembly detecting the gain and phase shift caused by each known symbol transmission at the plurality of receiver transducers.

The process of determining a channel gain matrix H can be repeated over time in order to track changes in signal gain over time.

The subcarriers may be modulated using phase key shifting (PSK), using quadrature amplitude modulation (QAM), or other methods.

Preferably the data rate of the MIMO signaling arrangement is at least as great as the combined total data rates of the plurality of communications channels if each communication channel is instead used individually.

The step of sending the transmit signal through the communication channels can include using bit-loading. Bit-loading can be implemented including by the transmitter assembly and the receiver assembly. The receiver assembly preferably provides receiver side information, including information regarding subcarrier signal to noise ratios, to the transmitter assembly and the transmitter assembly uses the receiver side information to determine a modulation level for use with each of a plurality of subcarriers. The bit-loading implementation preferably further comprises the steps of: choosing a target bit error rate (BER), choosing a modulation type, choosing at least one modulation level, calculating a target minimum signal to noise ratio (SNR) required to achieve the target bit error rate for a plurality of modulation levels, and, for each OFDM subcarrier, determining whether a first modulation level results in a SNR high enough to support bit-loading without exceeding the target bit error rate, and if the SNR is too low trying a higher modulation level, and if the SNR level is satisfactory filling a current frequency bin with a number of bits associated with the first modulation level.

In other embodiments using eigenmode transmission, the invention includes providing a transmit signal and using it to create a transmit vector x, multiplying the transmit vector x by a precoding matrix to produce a linearly transformed input vector, and transmitting the linearly transformed input vector from the first side of the barrier through the barrier using the MIMO signaling arrangement, wherein the communication channels making up the MIMO signaling arrangement are mathematically represented by a channel gain matrix H. The receiver assembly may receive the linearly transformed input vector as a received signal vector at the second side of the barrier. The received signal vector may be "shaped" by performing a linear transformation on the received signal vector using a receiver shaping matrix and thereby producing an output signal vector.

The eigenmode method of sending signals through a barrier preferably included transmitting the linearly transformed input vector from the first side of the barrier through the barrier comprises using orthogonal frequency division multiplexing (OFDM). Using OFDM comprises sending signals on a plurality of subcarriers.

The method might include deriving at least one decision variable from the output signal vector. The eigenmode method of sending signals through a barrier preferably further comprises using bit-loading as discussed elsewhere.

An embodiment of the invention using minimum mean-squared error (MMSE) crosstalk suppression may include sending a transmit signal vector from the first side of the barrier through at least one communication channel using at least one transmit transducer, receiving a receive signal vector at the receiver transducers, determining a weight matrix W for the plurality of communication channels which are part of the MIMO signaling arrangement and using minimum mean-squared error processing to cancel crosstalk within the MIMO signaling arrangement. The step of using minimum mean-squared error processing to cancel crosstalk comprises scaling the receive signal vector with the weight matrix W.

The step of sending a transmit signal from the first side of the barrier through the communication channels preferably comprises using orthogonal frequency division multiplexing (OFDM) and sending signals on a plurality of subcarriers as in other embodiments of the invention.

Preferably the weight matrix W is updated over time. Preferably the process of updating the weight matrix W comprises determining an error vector by comparing the actual transmit signal vector with the result of scaling the receive signal vector with the weight matrix W.

The minimum mean-squared error (MMSE) crosstalk suppression method of sending signals through a barrier preferably further comprises using bit-loading as discussed elsewhere.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
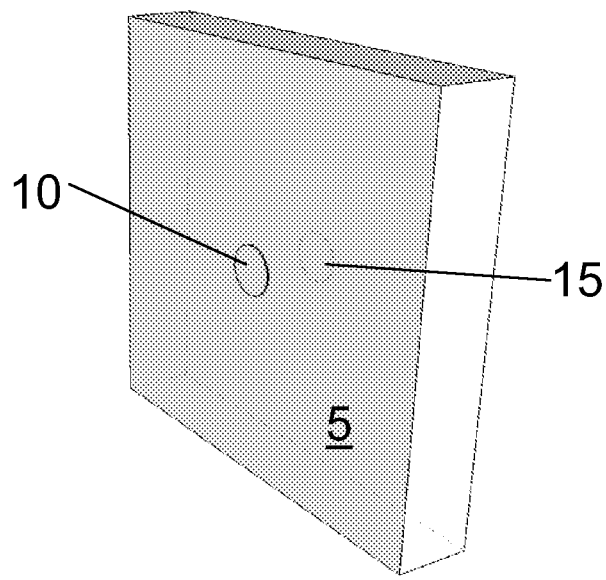
FIG. 1 is a schematic perspective view of a barrier with one pair of aligned transducers.
Figure 2:
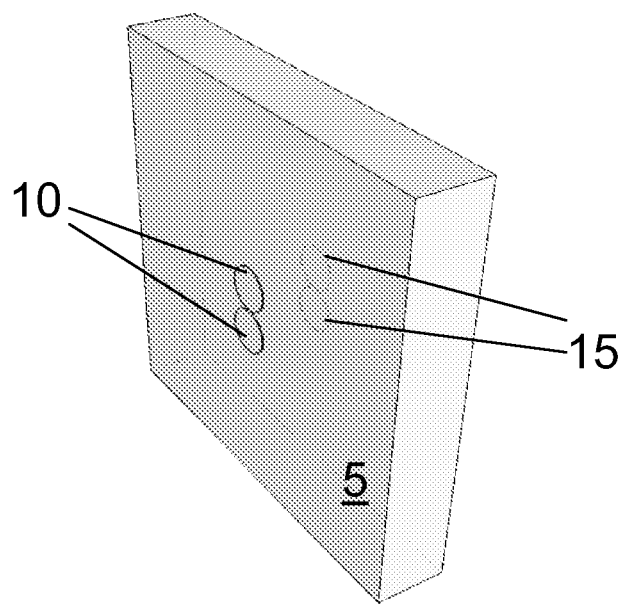
FIG. 2 is a schematic perspective view of a barrier with two pairs of aligned transducers.
Figure 3:
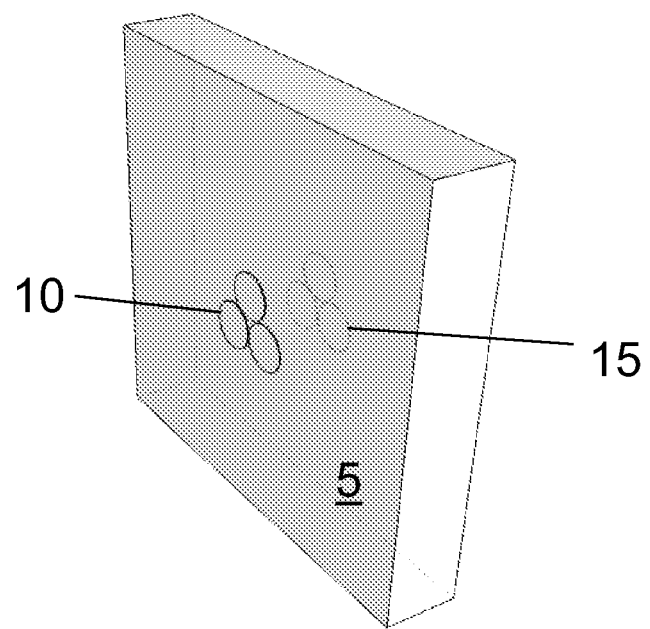
FIG. 3 is a schematic perspective view of a barrier with three pairs of aligned transducers.

Referring now to the drawings beginning with FIGS. 1-3, in order to achieve even higher through-wall data rates than those available in the prior art, this disclosure presents methods and arrangements for multi-carrier, multichannel techniques for communicating through an acoustic-electric channel consisting of two or more pairs of piezoelectric transducers, where typically the transmit transducer 10 and receive 15 transducer for each channel are mounted on opposing sides of a metal barrier 5. To minimize the "footprint" of the system, i.e. the size of the wall surface areas required for the system, it is sometimes desirable that the transducers of the multiple channels be mounted in close proximity to each other—i.e. the transmit transducers are close to other transmitters, the receiver transducers are close to other receivers. Although taking up less space and having other design advantages, closely spaced acoustic-electric channels result in strong crosstalk between the transducer channels, also called co-channel interference. In this disclosure we will use the terms "crosstalk," "co-channel interference," or just "interference" interchangeably. Several examples of acoustic-electric channel arrangements with one channel, two channels, and three channels are illustrated at FIGS. 1-3, respectively.

Figure 4:
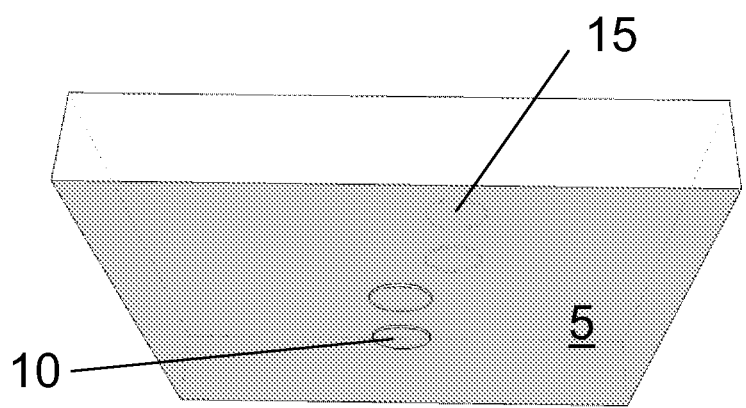
FIG. 4 is a schematic perspective view of a barrier with two pairs of misaligned transducers.

In FIGS. 1-3, the circular disks represent the transmit (Tx) 10 and receive (Rx) 15 transducers, which are co-axially aligned on opposing sides of a metallic barrier 5. However, it should be noted that the crosstalk cancellation techniques presented in this disclosure may also be applied in cases where transducers are not closely spaced, and also when the transmit and receive transducers are misaligned, as illustrated for example in the two-channel configuration in FIG. 4.

In this disclosure, the use of multiple communication channels is described which, in combination with crosstalk cancellation techniques, enables high-rate communication through thick metallic barriers 5 or other media in which electromagnetic techniques are ineffective. The theoretical rates that may be achieved using multiple channels far exceed those achievable by a single channel alone. Because of crosstalk between the multiple channels, however, there may be only marginal increases or, often times, even decreases in the throughput capability of multichannel systems as compared to that of single channel systems.

Using the present invention, however, multiple communication channels in combination with crosstalk cancellation techniques such as zero forcing, eigenmode, and minimum mean-squared error (MMSE), enable data rates that approximately scale with the number of channels. For example, a seven channel system with crosstalk cancellation will achieve data rates approximately seven times that of the single channel if effective cancellation techniques are applied. In general, for a system having N channels and employing the crosstalk cancellation techniques described in subsequent sections of this disclosure, the achievable data rate will be approximately N times that of the single channel. In this way, multiple channels in combination with crosstalk mitigation structures enables high-rate communication through metallic barriers and other media in which electromagnetic signals are not effective for wireless communication.

To illustrate the gains that can be achieved using crosstalk suppression, data is herein presented for the example cases in which there are two channels and seven channels. In each case, the channel capacity of a single channel is compared with that for the multi-channel case with and without crosstalk suppression. It is shown that, when using multiple acoustic-electric channels in parallel, crosstalk between the channels prevents significant increases in capacity over the single channel case. It is observed that, when strong crosstalk is present and the average signal-to-noise ratio (SNR) of the OFDM subchannels is decreased, the total capacity for the multichannel case levels off and is eventually surpassed by that for the single channel case. This result demonstrates the need for crosstalk cancellation techniques when using multiple acoustic-electric channels. Several crosstalk (interference) cancellation structures are herein investigated, including the zero forcing, eigenmode transmission, and minimum mean-square error (MMSE).

At this point, it is worth emphasizing one major difference between acoustic-electric (through-wall) and the wireless air channels—the wireless air channel is dynamic in nature, and fades may cause the channel to change significantly over short periods of time. The acoustic-electric channel is comparatively static in nature, and although significant changes may occur over time, the changes occur very slowly. Due to the relatively static nature of the acoustic-electric channel, a slowly adaptive approach, or techniques that require feedback from receiver to transmitter, may be used effectively.

Multiple-Input Multiple-Output (MIMO) Communication Channels:

2×2 MIMO Configuration

Figure 5:
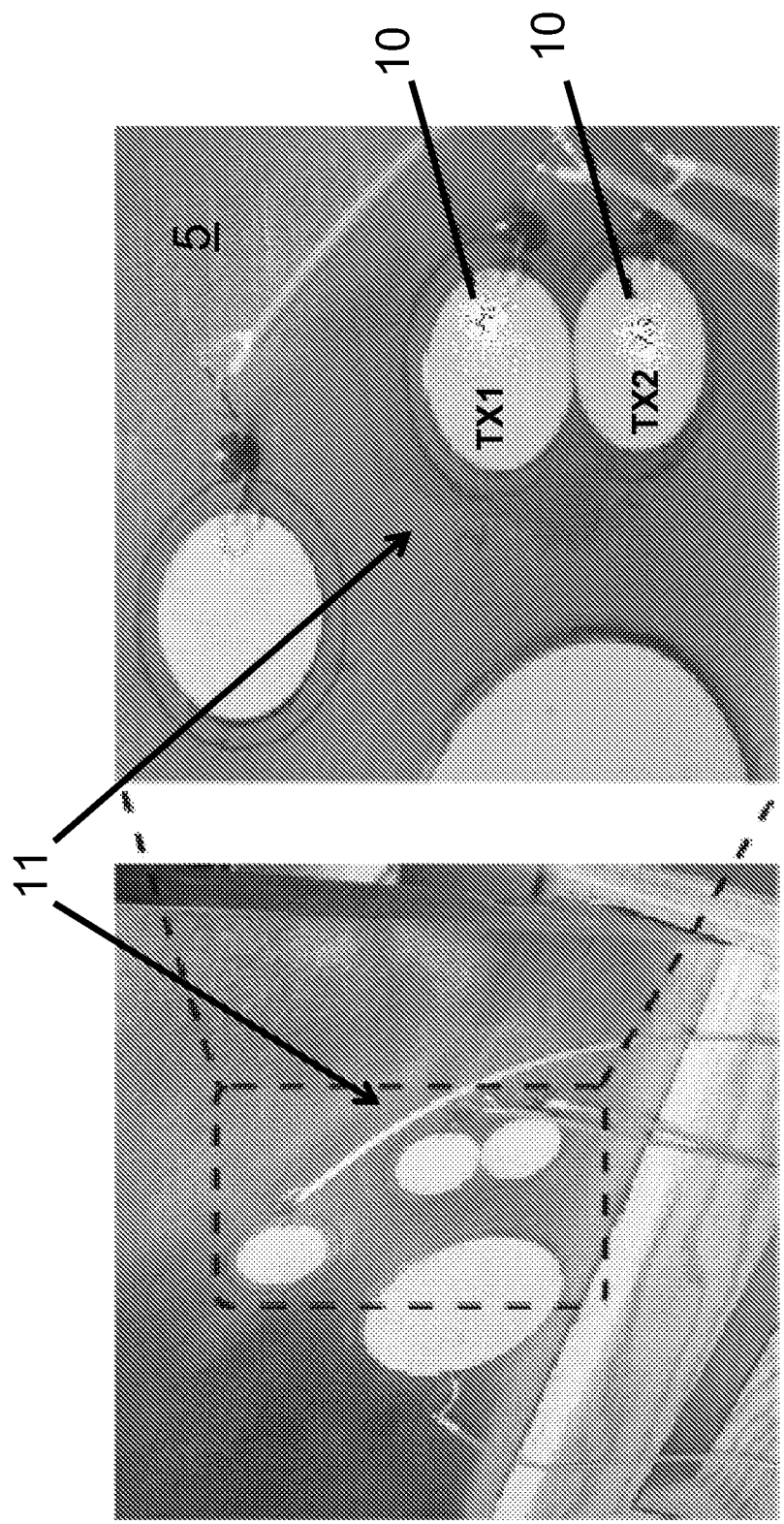
FIG. 5 is a composite view of a wall with attached transmit transducers and wiring, including a closeup of one section of the wall.

In this illustrative example, a two transmitter, two receiver (2×2) MIMO communication channel is formed using two pairs of co-axially aligned 25.4 mm (1 in.) diameter piezoelectric transducers, each having a nominal thickness-mode resonant frequency of 4 MHz, mounted on opposite sides of a steel barrier having a thickness of 63.5 mm (2.5 in). The transducers are acoustically coupled to the metallic barrier using epoxy in this case, and are mounted with their outer diameters almost touching, which will typically introduce the strongest co-channel interference from acoustic beam divergence. Two transmit transducers 10 mounted to one side of the steel barrier are shown in FIG. 5. The right portion of FIG. 5 is a close-up of part of the left portion of FIG. 5, as indicated by the dashed lines. Both transmit transducers 10, and well as other components such as electronics which are involved in sending signals from the "send" side of the barrier 5, may be collectively referred to as the transmitter assembly 11.

Figure 6:
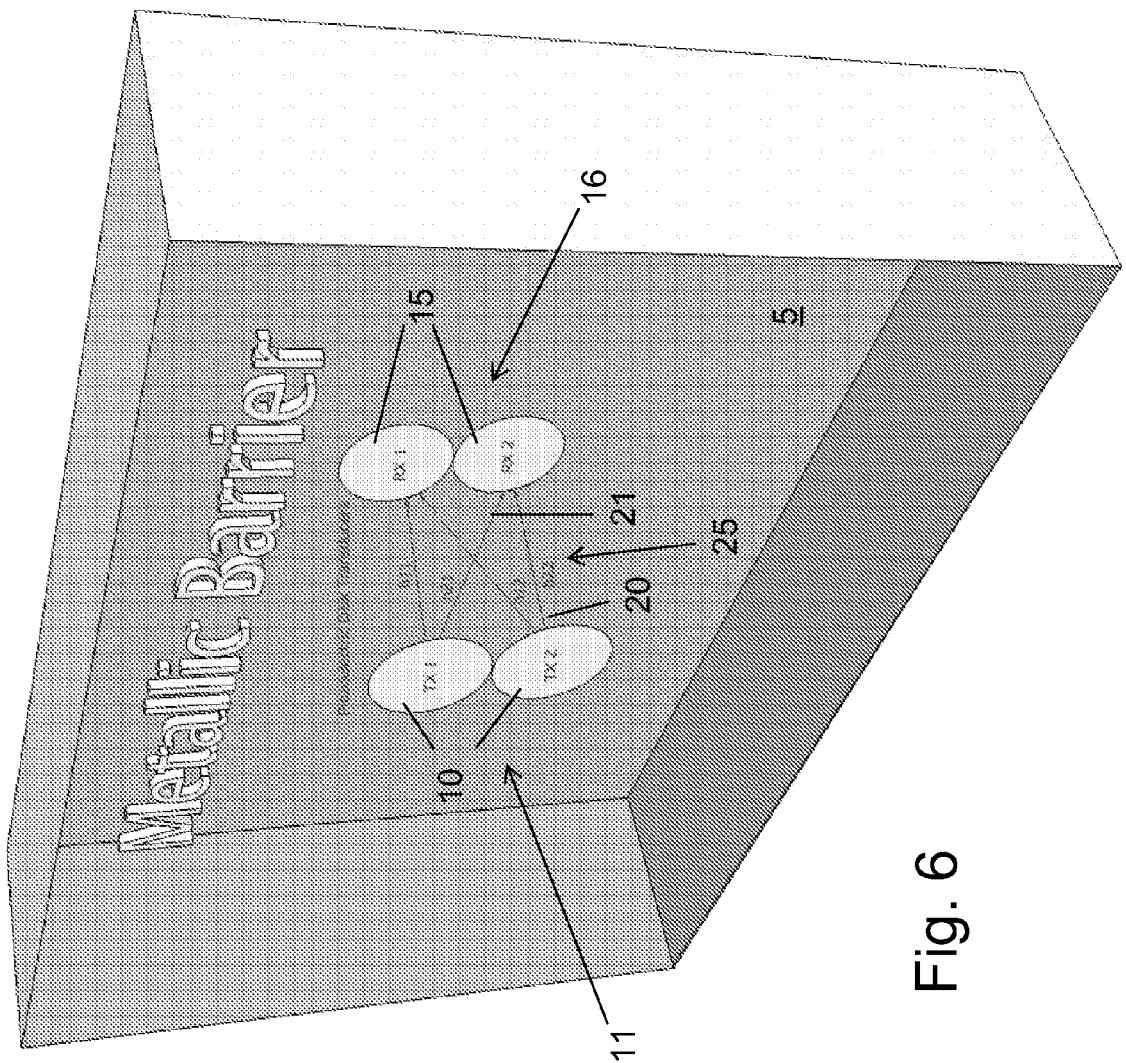
FIG. 6 is a diagram of two pairs of transducers on a barrier conceptually showing direct communication and crosstalk channels.

The two transmit transducers 10 are labeled Tx1 and Tx2 in FIG. 5. The two corresponding receiver transducers Rx1 and Rx2 (schematically illustrated in FIG. 6 and numbered 15) are co-axially aligned with the respective transmit transducers and are mounted on the opposite side of the steel barrier. FIG. 6 schematically illustrates both (straight) direct 20 and (diagonal) crosstalk 21 channels through the wall. The 2×2 MIMO communication channel 25 included both direct channels 20 labeled h11 and h22. Both receiver transducers 15, and well as other components such as electronics which are involved in receiving and processing signals from the "receiver" side of the barrier 5, may be collectively referred to as the receiver assembly 16. In some embodiments transmitter assembly and/or receiver assembly may both send and receive various signals, and the terms "transmitter" and "receiver" are not considered functionally limiting in this context.

A network analyzer was utilized to characterize the direct and interfering channels over a wide frequency range. A depiction of the direct 20 and crosstalk 21 channels is given in FIG. 6 for the illustrative 2×2 MIMO configuration 25. Channel gains as a function of frequency were measured for both the direct channels and crosstalk channels. For example, the direct channels in the two-channel case in FIG. 6 are formed between TX1-RX1 and TX2-RX2 for channels 1 and 2, respectively. The crosstalk channels are between TX1-RX2 and TX2-RX1. The channel gains are denoted by coefficients $h_{ij}$, where the subscripts refer to receiver i and transmitter j. For example, entry $h_{12}$ is the channel gain between from TX2-RX1, which in this case is a crosstalk interference "channel".

Figure 7:
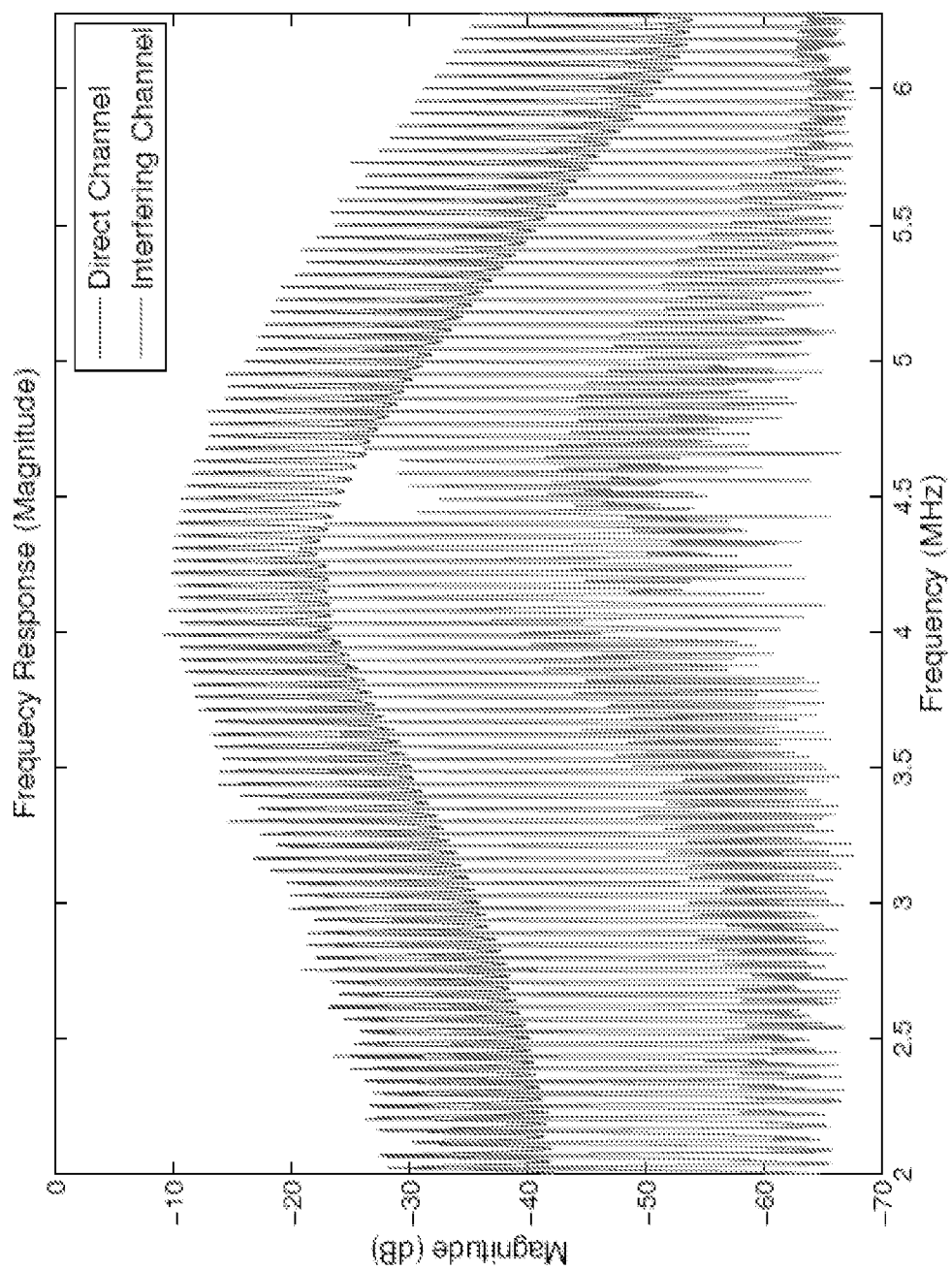
FIG. 7 is a graph of response magnitudes in decibels for a direct (top) and interfering (bottom) channel across a range of frequencies.

The responses of the two direct channels $h_{11}$ and $h_{22}$ in this example (FIG. 6) are nearly identical. The same is true for the interfering channels. FIG. 7 illustrates frequency responses in this example for a direct channel and an interfering channel for frequencies in the range 2 MHz-6.28 MHz. It should be noted that in this example transformers with 4-to-1 turns ratios were used as wideband matching networks between the network analyzer and the ultrasonic transducer at each port to improve its response.

In FIG. 7, it is worth noting that the magnitude of the interfering response is significant but not large. It should be noted that the decibel (dB) scale in FIG. 7 is logarithmic so that, for example, −30 is actually ten times stronger than −40. The average magnitude of the signal-to-interference power ratio ("SIR", the direct channel/interfering channel in this case) across the characterized frequency range is 27.88 dB, with a worst case SNR of approximately 3 dB. It is also worth noting that the acoustic-electric communications channel is extremely frequency selective, having a coherence bandwidth—the range of frequencies over which the channel gain is relatively constant (flat)—of approximately 5 kHz. As a result, OFDM is used with 4096 evenly spaced subcarriers (1 kHz) such that the subcarriers will undergo flat fading rather than frequency selective fading. Each subcarrier can be modulated using a conventional scheme such as Phase Shift Keying (PSK) or Quadrature Amplitude Modulation (QAM). OFDM is an advanced modulation technique and exhibits high spectral efficiency in frequency selective channels. Despite the fact that each OFDM subcarrier is modulated at a relatively low data rate in these examples, the aggregate data rate is large since there are so many of them.

7×7 MIMO Configuration

Although this invention can be used with a range of transducer pairs, a MIMO configuration comprising seven transducer pairs is provided to show how the system generally works using more than two pairs.

Figure 8:
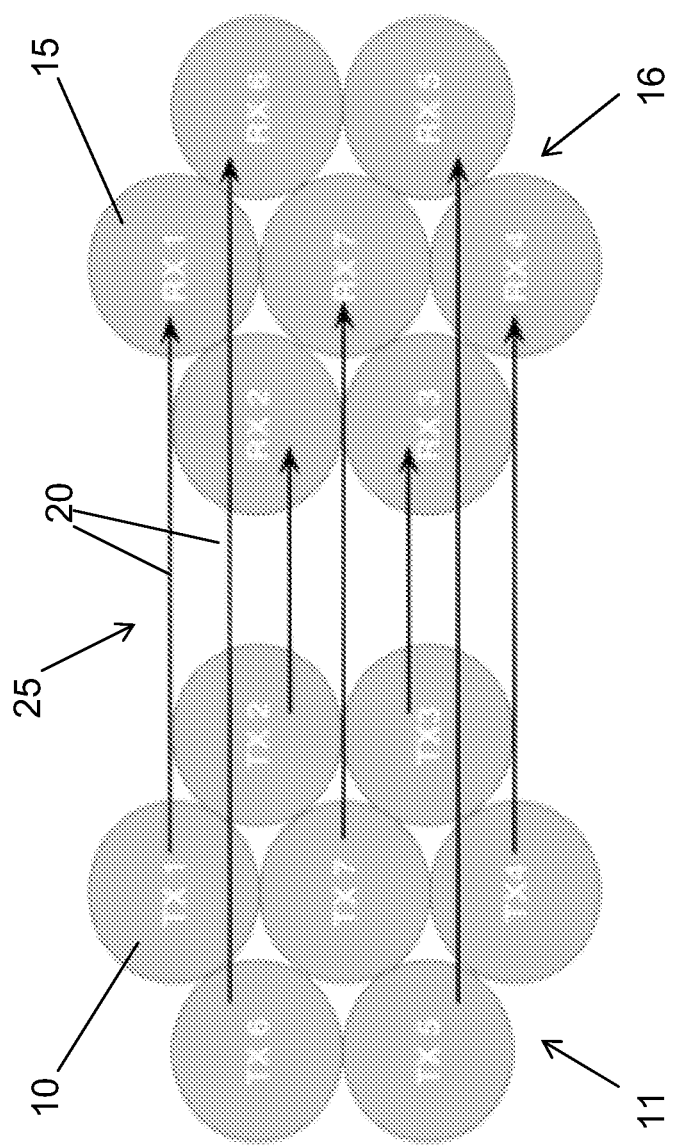
FIG. 8 conceptually view shows a 7×7 MIMO configuration including seven direct communication channels.

A seven transmitter, seven receiver (7×7) MIMO communication channel 25 was formed using seven pairs of co-axially aligned 10 mm (0.3937 in.) diameter piezoelectric transducers 10, 15 each having a nominal thickness-mode resonant frequency of 4 MHz, mounted on opposing sides of a steel barrier having a thickness of 40 mm (1.575 in.). The transducers were acoustically coupled to the metallic barrier 5 using epoxy, and were mounted with their outer diameters almost touching, which will introduce the strongest co-channel interference from acoustic beam divergence. For this embodiment, the transmit 10 and receive 15 transducers were mounted in a honeycomb-shaped arrangement with nearly touching outer diameters, as illustrated in FIG. 8, although other arrangements are possible.

Figure 9:
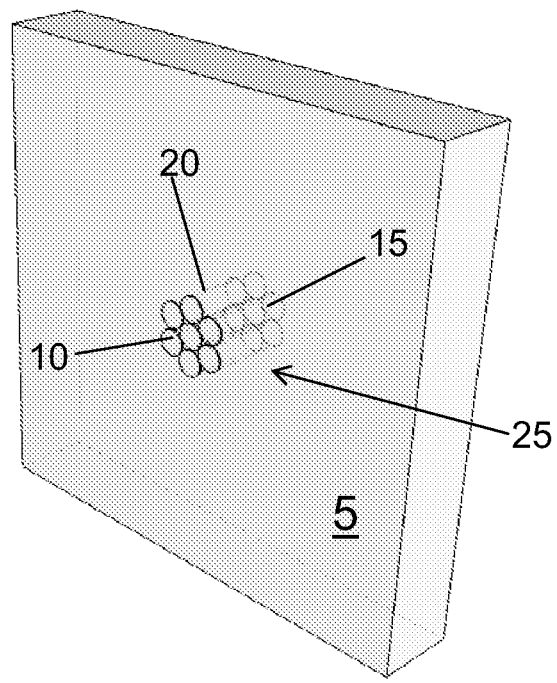
FIG. 9 is a schematic perspective view of a barrier with seven acoustic-electric direct channels across the barrier.
Figure 10:
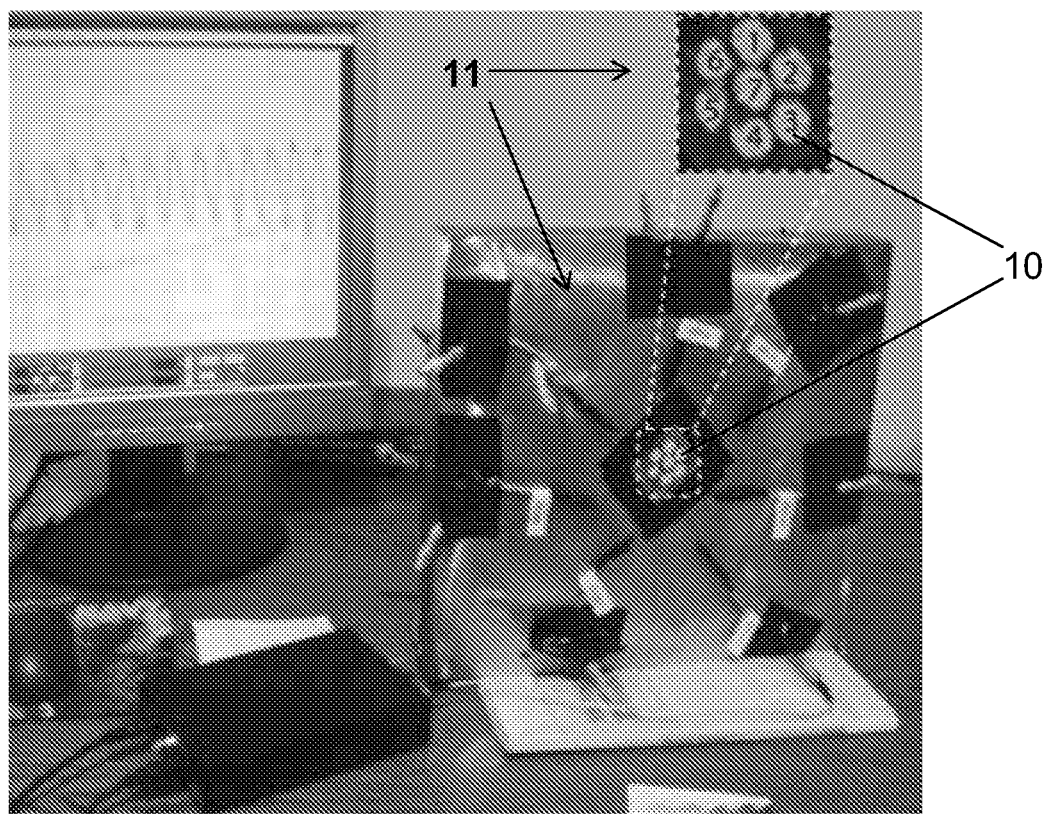
FIG. 10 is a photograph of seven transmit transducers on a metallic barrier including a numbered closeup of the transducers.

FIG. 9 is an illustration showing the seven acoustic-electric channels 20, comprising seven pairs of transducers mounted on opposite sides of a metallic barrier 5. The actual metallic wall with seven channels used in this example is shown in FIG. 10. The inset of FIG. 10 shows the seven transmit transducers 10 labeled 1-7. The seven corresponding receiver transducers 15 (not visible in FIG. 10 but illustrated schematically in FIG. 9) are co-axially aligned with the respective transmit transducers, and are mounted on the opposite side of the steel barrier.

Figure 11:
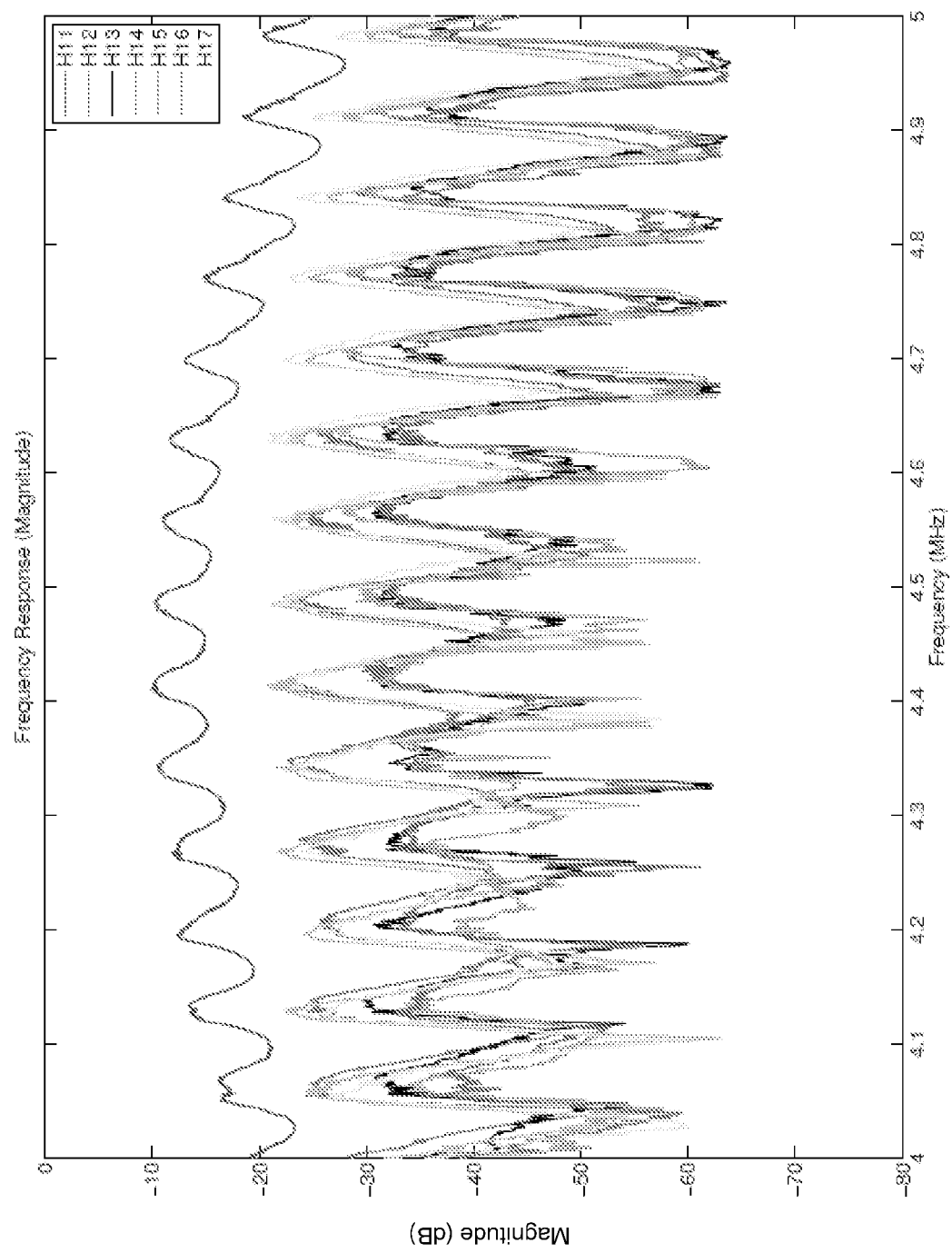
FIG. 11 is a graph of response in decibels for a single direct channel and six crosstalk channels originating from the same transmit transducer.

FIG. 11 shows the magnitude in decibels (dB) for the single direct channel and six crosstalk channels for channel 1 in the seven channel example with no crosstalk suppression. Although the crosstalk peaks are more than 10 dB down from the peaks of the direct channel, and although the scale is logarithmic, this crosstalk can still have a major effect on the aggregate capacity of the channels. Unless this crosstalk is suppressed, it will be difficult or impossible to increase the data rate through the use of parallel channels. The remainder of this disclosure presents the use of three crosstalk cancellation structures which we have found the be highly effective. These crosstalk cancellation structures include zero forcing, eigenmode, and minimum-mean squared error, which have never before been applied in the context of acoustic-electric multi-channel communication.

Analysis of Effect of Crosstalk Mitigation on Channel Data Capacity

Several crosstalk mitigation techniques were explored for the multiple acoustic-electric channel links. This section derives analytical expressions for the signal to interference plus noise ratio (SINR) that is used to compute the theoretical capacity of several MIMO acoustic-electric links. The analytical expressions for SINR are then verified by comparing them to Monte Carlo simulation results.

The analysis assumes a MIMO channel and Additive White Gaussian Noise (AWGN) at each receiver, producing the equation $$y = Hx + \eta$$

where y denotes the received signal vector, H denotes the channel gain matrix, x denotes the transmitted signal vector, and η denotes the noise vector whose elements are Gaussian random variables. For the 2×2 case shown in FIG. 6, the channel gain matrix is formed using the channel gains, $h_{ij}$, as $$H = \begin{bmatrix} h_{11} & h_{12} \\ h_{21} & h_{22} \end{bmatrix}.$$

According to the Shannon limit theorem, the theoretical capacity (C) of a channel subject to AWGN may be expressed as $$C = B[\log_2(1+SNR)]$$

where B is the bandwidth of the channel and SNR denotes the signal-to-noise ratio. In the case where interference (crosstalk) is present, approximate capacity results are found when SNR is replaced by the signal-to-interference plus noise ratio (SINR) which may be expressed as $$SINR = \frac{P_S}{P_I + P_N},$$

where $P_S$, $P_I$ and $P_N$ denote the signal power, interference power, and noise power, respectively. In forming this equation it is assumed that the interference can be modeled effectively as additional white Gaussian noise. Letting A denote the number of physical channels and M denote the number of OFDM subcarriers, the maximum MIMO-OFDM channel capacity may be approximated as:

$$C = \Sigma_{n=1}^{A} \Sigma_{m=1}^{M} B[\log_2(1+SINR_a(m))]$$

The bandwidth B is assumed to be the same for the channels A, and uniform OFDM subcarrier spacing is assumed for each physical channel. It should be noted that the result of the above equation for maximum MIMO-OFDM channel capacity assumes no inter-carrier interference (ICI).

Figure 12:
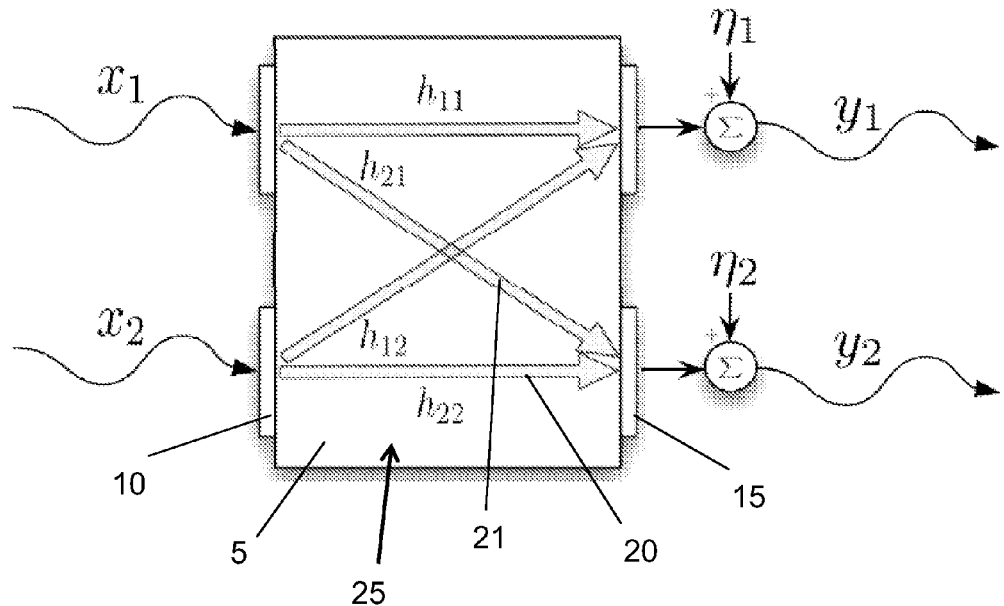
FIG. 12 illustrates the conceptual elements of a channel gain matrix H for a 2×2 MIMO.

In the remainder of this section, the theoretical total capacity for the A×A MIMO case, i.e. the case with A transmitters and A receivers is found. Expressions for $P_S$ and $P_I + P_N$ are derived for a single OFDM subcarrier using a variety of crosstalk mitigation structures. The expressions are used to determine the maximum theoretical capacity for each case. Throughout the analysis of each technique, it should be noted that the channel gain matrix H may be denoted by the entries $h_{ij}$, where i and j correspond to the $i^{th}$ and $j^{th}$ receiver and transmitter, respectively. The conceptual elements of H for the 2×2 MIMO case are illustrated FIG. 12, which contains a cross-sectional view of multiple co-axially aligned transducer pairs mounted on opposite faces of the metallic barrier.

For the A×A MIMO case in which A independent channels are assumed, i.e., no crosstalk among channels, the receiver signals may be written as $$y = Hx + \eta,$$

where the off-diagonal elements of H are zero. This may be expressed as $y_i = h_{ii} x_i + \eta_i$, for i=1, 2, . . . , A. Without loss of generality, this analysis assumes a transmit power of unity for the signals $x_i$. These signals are scaled by the direct channel gains $h_{ii}$, yielding a received signal power of $$P_i(S_i(i)) = |[h_{ii}]|^2 \; i=1, 2, \ldots, A$$

where $P_{S_i}$ denotes the received signal power on channel i. The noise power at the receivers may be written as $$P_{N_i} = \sigma_i^2 \; i=1, 2, \ldots, A$$

where $\sigma_i^2$ denotes the variance of $\eta_j$.

Crosstalk without Interference Suppression

For the A×A MIMO case with crosstalk between the channels and no interference mitigation, the receive signal vector may again be written in matrix form as $$y = Hx + \eta,$$

where, now, H has non-zero off-diagonal elements that represent the crosstalk. Again, assuming a transmit power of unity for the transmit signals (entries of x) the receive signal power at the $i^{th}$ receiver due to the signal transmitted at the $i^{th}$ transmitter is $$P_{S_i} = |h_{ii}|^2, \; i=1, 2, \ldots, A.$$

It is assumed that the interfering signals, i.e. the crosstalk, due to each other transmitter can be approximated as additional uncorrelated white Gaussian noise. The crosstalk power at the $i^{th}$ receiver is then added to the actual additive white Gaussian noise power at that receiver to produce the total noise plus interference power $$P_{I_i} + P_{N_i} + \sigma_i^2 + \sum_{j \neq i} |h_{ij}|^2, \; i, j = 1, 2, \ldots, A$$

Crosstalk with Interference Suppression Using Zero Forcing

The zero forcing interference cancellation structure cancels crosstalk by scaling the receive vector with the inverse of the channel gain matrix, i.e., $z = H^{-1} y$ Substituting the expression for y obtained previously into this expression yields $z = H^{-1} Hx + H^{-1} \eta$, which simplifies to $z = x + H^{-1} \eta$, or $z = x + G\eta$, where $G = H^{-1}$.

For an A×A MIMO channel, the entries of G may be denoted by $g_{ij}$. The output of the zero forcing interference cancellation structure is written as $$z_i = x_i + g_{i1} \eta_1 + g_{i2} \eta_2 + \ldots + g_{iA} \eta_A, \; i=1, 2, \ldots, A$$

Assuming a power of unity for each transmitted signal, the received signal power at the $i^{th}$ receiver due to the $i^{th}$ transmitter is equal to $$P_{s_i}=|h_{ii}|^2, i=1, 2, \ldots, A$$

After zero forcing, i.e. pre-multiplication by G, that received signal power becomes $$P_{s_i}=1, i=1, 2, \ldots, A$$

The zero forcing solution eliminates the crosstalk. The noise power at the receivers may be written as $$P_{N_i} = \sum_{j=1}^{A} |g_{ij}|^2 \sigma_j^2, \quad i = 1, 2, \ldots, A.$$

Figure 13:
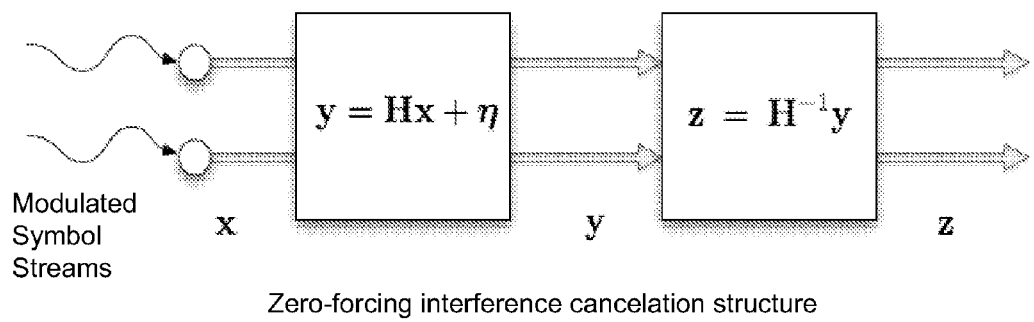
FIG. 13 illustrates a zero-forcing interference cancellation structure.

A diagram of the zero-forcing interference cancellation structure is provided in FIG. 13.

The zero forcing approach may be implemented without expensive processing and yields good performance for a given set of channel gains. Clearly, the receiver must develop an estimate of the channel gain matrix, H, which it can use to form G. In an OFDM implementation, this channel information can be obtained by occasionally transmitting known symbols on each subcarrier and detecting the gain and phase shift that is introduced by the channel at the receiver. These known symbols must be sent frequently enough to allow the receiver to track any changes in the channel gains over time. A drawback of the zero forcing approach is that it may also result in noise enhancement for weak channels. For these reasons, the zero forcing approach may only be desirable in channels having relatively modest gain variations that undergo very minor changes over time.

Crosstalk with Interference Suppression Using Eigenmode Transmission

Eigenmode transmission theoretically provides the highest capacity in a MIMO system. See S. H. Ting, K. Sakaguchi, and K. Araki, "A robust and low complexity adaptive algorithm for MIMO eigenmode transmission system with experimental validation," Wireless Communications, IEEE Transactions on, July 2006. Performing the singular value decomposition (SVD) on the channel gain matrix H results in $$H=U\Sigma V^H$$

where $(\ )^H$ denotes the Hermitian (complex conjugate transpose) matrix operator, U and V are unitary receiver shaping and transmit precoding matrices, respectively, and $\Sigma$ is a diagonal matrix with elements $\lambda_i$ denoting the $i^{th}$ singular value of H. Note that U and V are unitary meaning that $U^HU=I_{A_r}$ and $V^HV=I_{A_t}$, where $I_{A_r}$ and $I_{A_t}$ are identity matrices of dimension $A_r$ and $A_t$, the number of receivers and transmitters of the channel, respectively.

Figure 14:
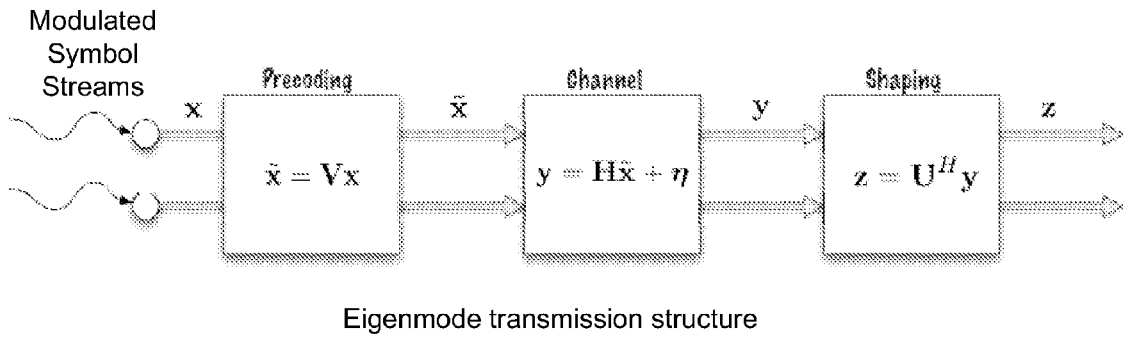
FIG. 14 illustrates an eigenmode transmission structure.

A diagram of the eigenmode transmission structure is given in FIG. 14.

The transmit vector x is multiplied by the transmit precoding matrix V producing the linearly transformed input vector, $=Vx$. After passing through the channel gain matrix H, and substituting the expression for, the receive signal vector becomes $$y=HVx+\eta$$

Inserting the SVD of H yields $$y=U\Sigma V^H Vx+\eta,$$

which simplifies to $$y=U\Sigma x+\eta$$

The received signal vector y undergoes a linear transformation in the receiver via the receiver shaping matrix U, resulting in the output signal vector z which may be written as $$z=U^H y=U^H U\Sigma x+U^H \eta = \Sigma x+U^H \eta.$$

The decision variable at the $i^{th}$ receiver may be written as $$z_i=\lambda_i x_i+u_{1i}^*\eta_1+u_{2i}^*\eta_2+\ldots+u_{Ai}^*\eta_A, i=1, 2, \ldots, A$$

where $(\ )^*$ denotes the complex conjugate operator and $u_{1i}^*, u_{2i}^*, \ldots, u_{Ai}^*$, are elements of $U^H$. Assuming a transmit signal power of unity, the received signal power at the $i^{th}$ receiver after receiver shaping can be expressed as $$P_{s_i}=|\lambda_i|^2, i=1, 2, \ldots, A$$

and the noise power at the receivers is written as $$P_{N_i} = \sum_{j=1}^{A} |u_{ji}^*|^2 \sigma_j^2, \quad i = 1, 2, \ldots, A$$

The eigenmode transmission approach yields the best performance of the interference cancellation structures. However, it is also the most complex, requiring that channel side information be sent back from the receiver to the transmitter.

Crosstalk with Interference Suppression Using Minimum Mean-Squared Error (MMSE)

The objective of the minimum mean-squared error (MMSE) approach is to minimize the average mean-square error between the transmitted signal and the detected signal at the output of the structure.

The MMSE output is formed as in the zero forcing case except that $H^{-1}$ is replaced by a weight matrix W with elements $w_{ij}$. The decision variable is $z=Wy$. An error vector, denoted by e, is generated by comparing z to the actual transmit symbol vector as $$\epsilon=x-z$$

The goal of the MMSE is to minimize the error in the mean square sense such that the decision variable will approximate the actual transmitted signal. According to the orthogonality principle, the error is at a minimum when $$E\{y\epsilon^H\}=0.$$

Assuming that the transmit signals are uncorrelated, signal and noise are uncorrelated, noise at the receivers is uncorrelated, and that the transmit signals have unity power, an expression for the weight matrix may be obtained according to equation above yielding $$W=[HH^H+D^{-1}]H]^H$$

where D is a diagonal matrix having entries $\sigma_i^2$. The symbols at the output of the MMSE structure are written as $$z=WHx+W\eta$$

Letting M=WH with entries $m^{ij}$, this expression becomes:

$$z=Mx+W\eta$$

For an A×A MIMO channel, the decision variable for the $i^{th}$ channel can be written as:

$$z_i = \sum_{j=1}^{A} m_{ij} x_j + \sum_{j=1}^{A} w_{ij} \eta_j \quad i = 1, 2, \ldots, A.$$

Assuming a power of unity for the each transmitted signal, the received signal power at the $i^{th}$ receiver due to the signal from the $i^{th}$ transmitter after passing through the MMSE structure is $$P_{s_i} = |m_{ii}|^2, \ i=1, 2, \ldots, A$$

and the interference plus noise power at the $i^{th}$ receiver is $$P_{I_i} + P_{N_i} = \sum_{\substack{j=1 \\ i \neq j}}^{A} |m_{ij}|^2 + \sum_{j=1}^{A} \sigma_j^2 |w_{ij}|^2, \quad i=1, 2, \ldots, A.$$

Figure 15:
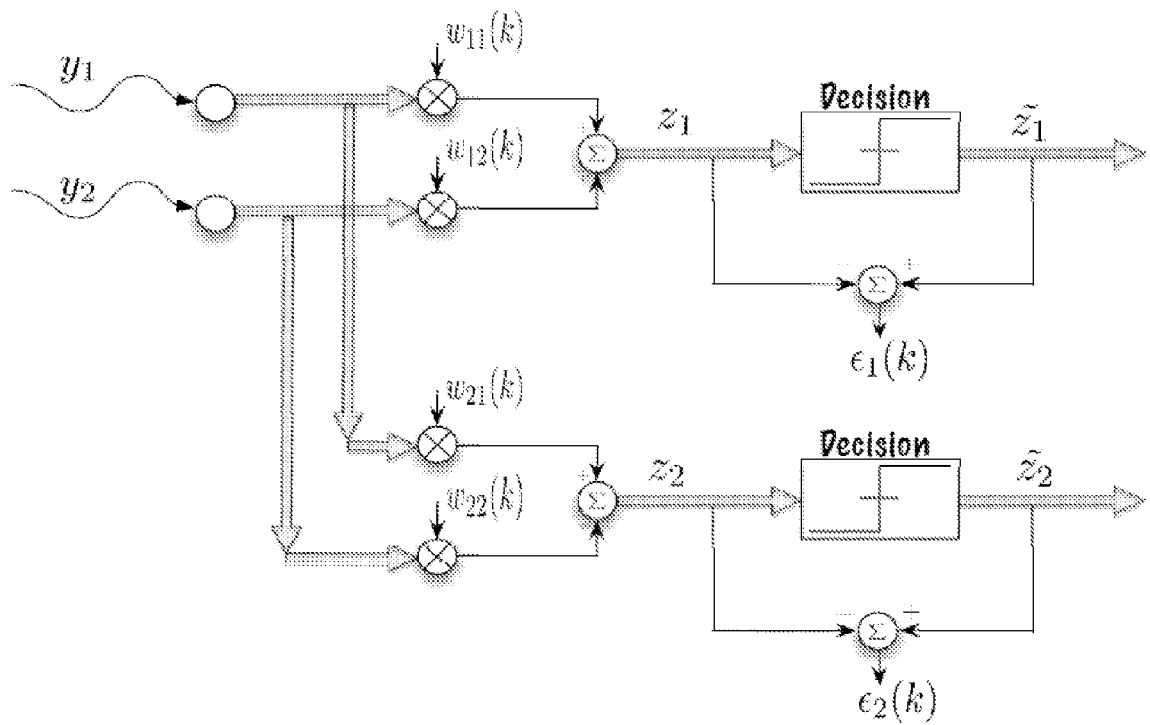
FIG. 15 diagrams a least mean square interference structure for a 2×2 MIMO case.

In practice, the MMSE receiver is approximated using the LMS algorithm, which can be implemented using a decision directed approach that can learn and track the channel's response. In a decision directed approach, the algorithm is guided by using the symbol decisions instead of the known symbol values. An initial training phase in which known symbols are transmitted may be needed to gain initial convergence before switching to decision directed mode. With a sufficiently small convergence factor μ, the LMS algorithm will converge to the MMSE solution. A diagram of the LMS interference cancellation structure for the A=2 case is given in FIG. 15. The advantage of this approach is that the filter tap weights may be updated to account for slowly changing channel conditions based on the error signal that equals the decision minus the decision variable. The weight update equations for the LMS algorithm are given by $$w_{ij}(k+1) = w_{ij}(k) + 2\mu\epsilon_i(k)y_j^*(k), \ i, j=1, 2, \ldots, A$$

The MMSE/LMS approach is very similar to the zero forcing in terms of complexity with the added benefits that it can adapt to slowly changing channel conditions without sending additional known symbols from the transmitter and does not suffer from noise enhancement.

EXPERIMENTAL RESULTS

Two-Channel Theoretical Capacity Results

Figure 16:
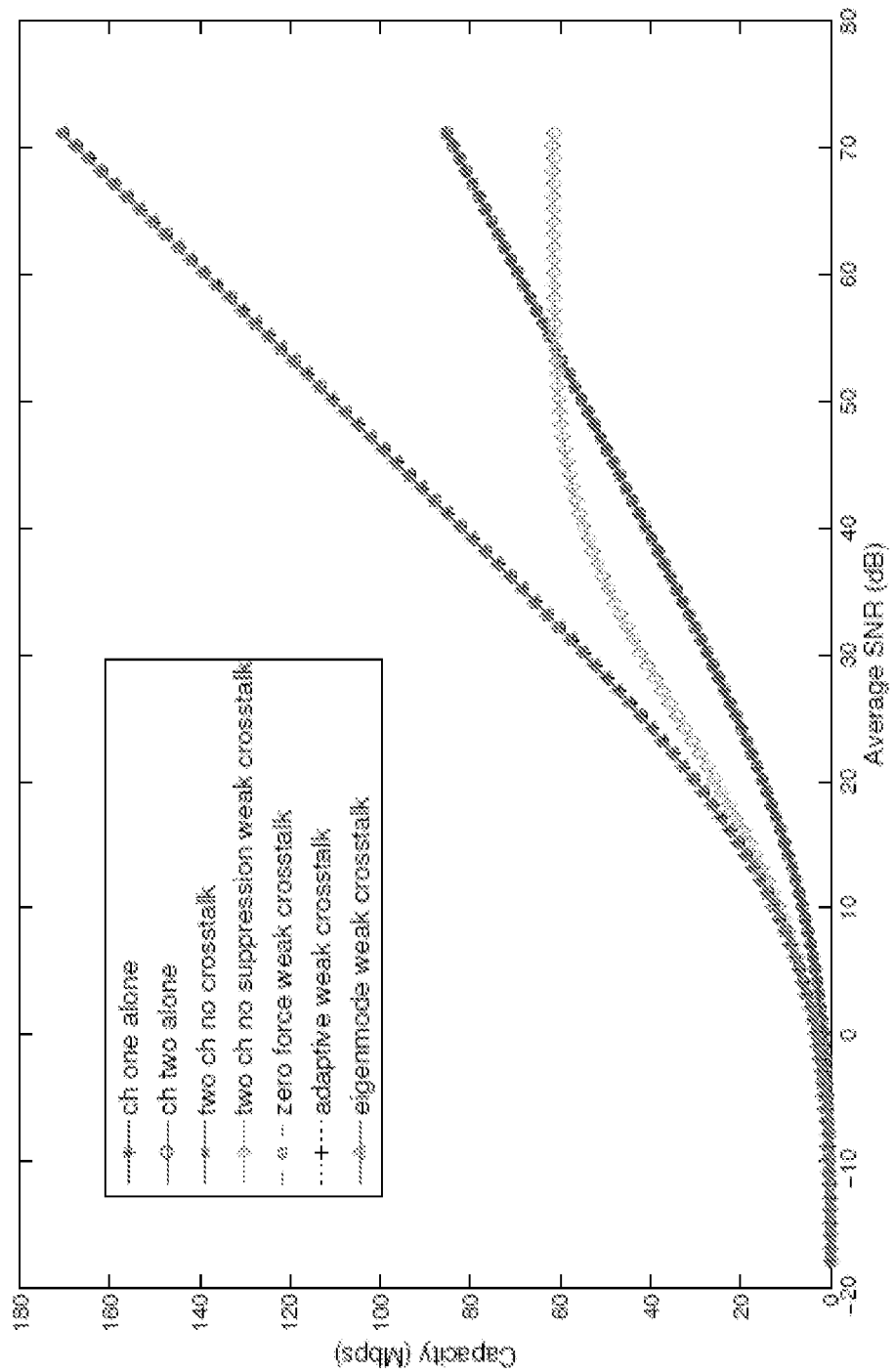
FIG. 16 is a graph of 2×2 MIMO acoustic-electric channel capacity comparison curves with weak crosstalk.
Figure 17:
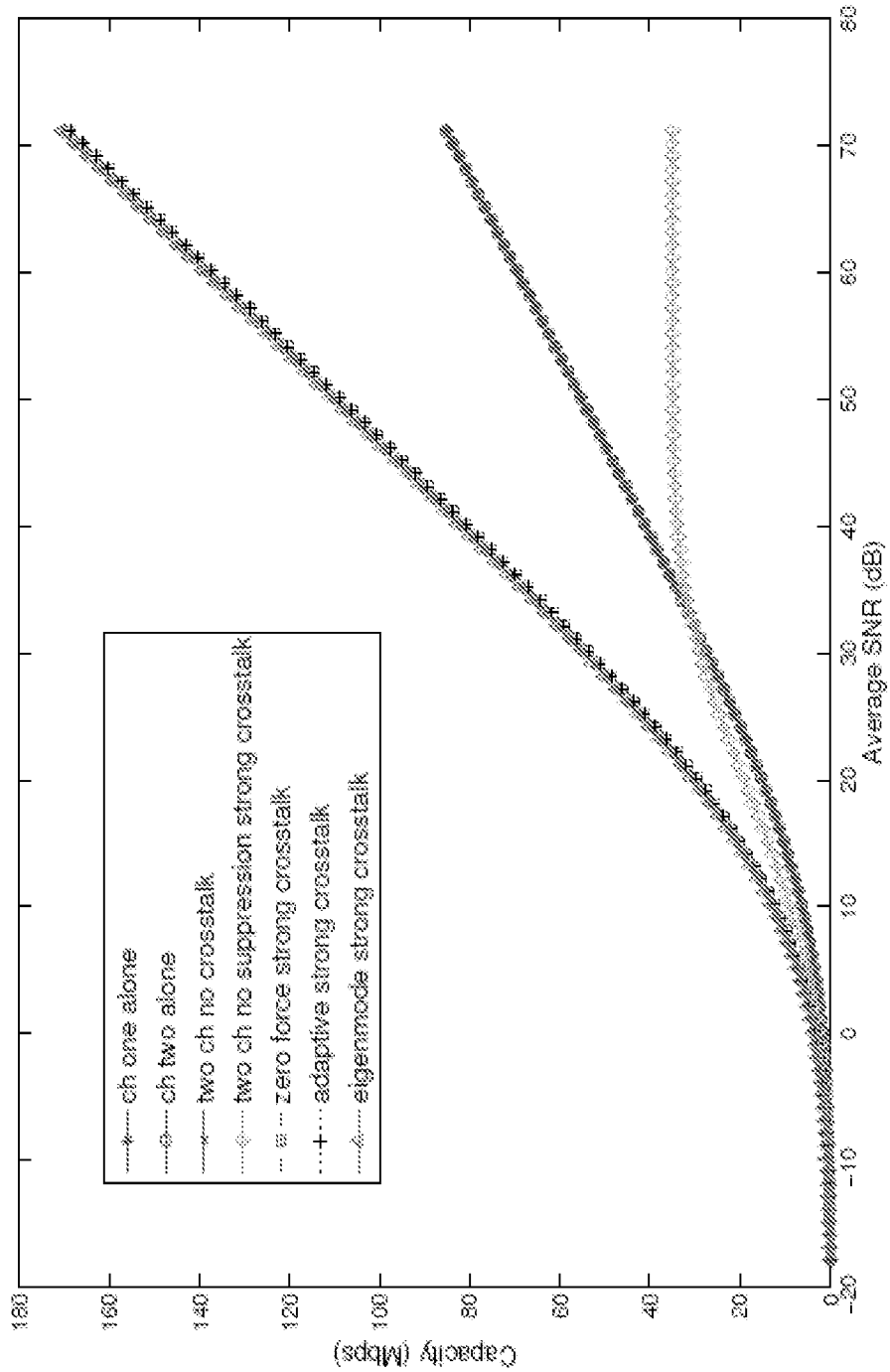
FIG. 17 is a graph of 2×2 MIMO acoustic-electric channel capacity comparison curves with strong crosstalk.

The expressions for SNR and SINR were used to determine the two-channel theoretical maximum capacity for the full OFDM signaling case. FIG. 16 shows the capacity performance results for various scenarios under relatively weak crosstalk. Here, the crosstalk found from the channel measurements shown in FIG. 7 were used to compute the results. FIG. 17 shows the capacity performance results for the same cases under relatively strong crosstalk. Here, the crosstalk values from the measurements were increased by 10 dB. It is assumed that the noise power, $\sigma_i^2$, is the same for all subcarriers on both physical channels. Due to the variation in signal attenuation, the SNR varies among the subcarriers. The plot uses average SNR on the horizontal axis.

For both sets of results, the performance for each of the channels alone is the same and the plots coincide (solid dark circles curve, ends in middle). When both channels are active simultaneously with crosstalk (hollow diamonds curve, ends lowest), the performance at low values of SNR is better than that for a single channel but, as SNR increases, the two channel performance becomes worse than that for a single channel. With stronger crosstalk, this cross-over occurs at a lower value of SNR. Without crosstalk, using two channels provides double the capacity of a single channel and capacity continues to increase as SNR increases. This result is shown in blue but is difficult to see since it is in the group of performance curves that includes the results for the various crosstalk suppression techniques. The cases with crosstalk and crosstalk suppression using the zero forcing, eigenmode, and MMSE structures, have performance similar to that for two channels without crosstalk. The rank in terms of performance from lowest (worst) to highest (best) among the three structures is the zero forcing, MMSE, and eigenmode. The eigenmode case actually performs slightly better than two channels without crosstalk.

Seven-Channel Theoretical Capacity Results

Figure 18:
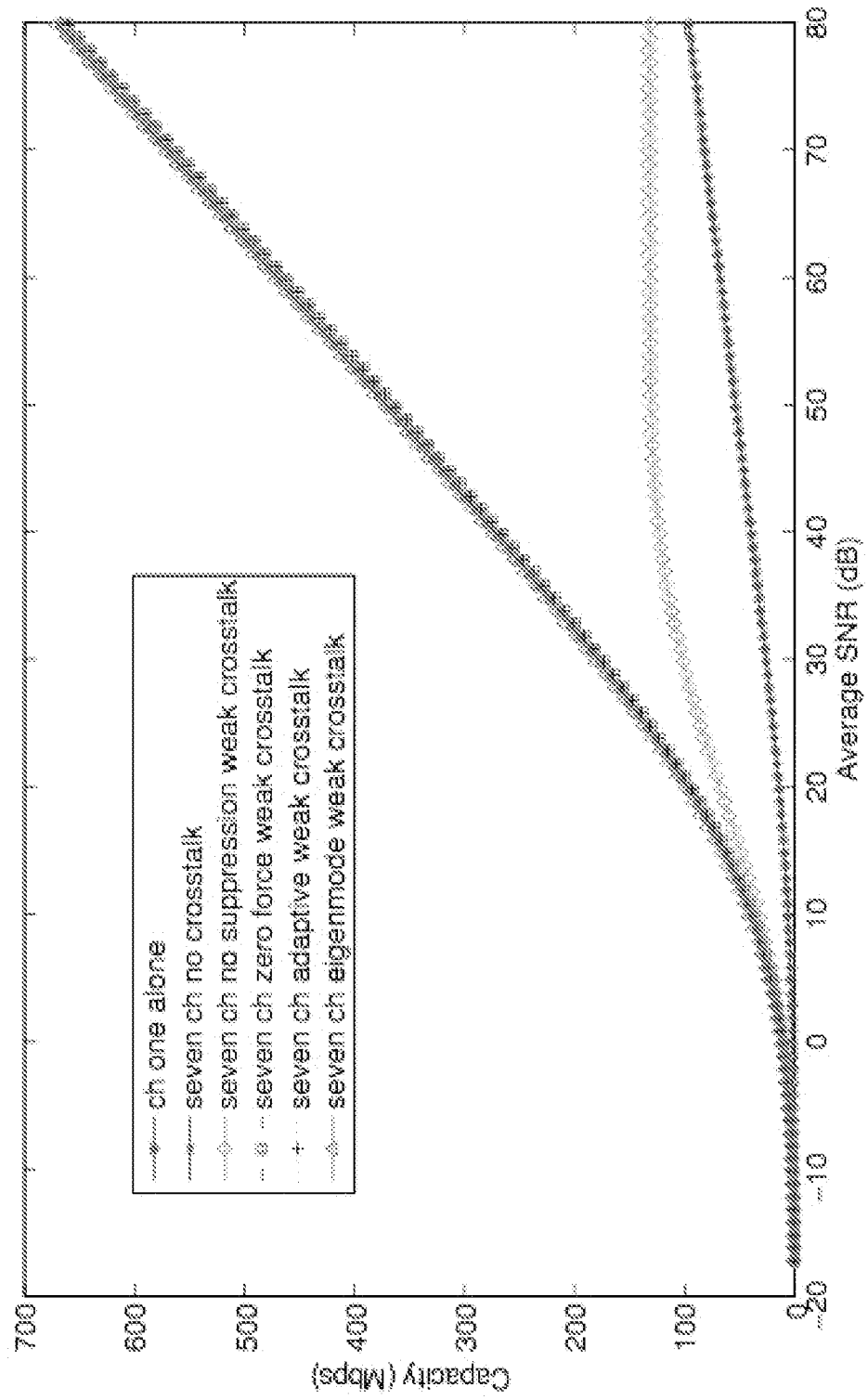
FIG. 18 is a graph of 7×7 MIMO acoustic-electric channel capacity comparison curves with weak crosstalk.
Figure 19:
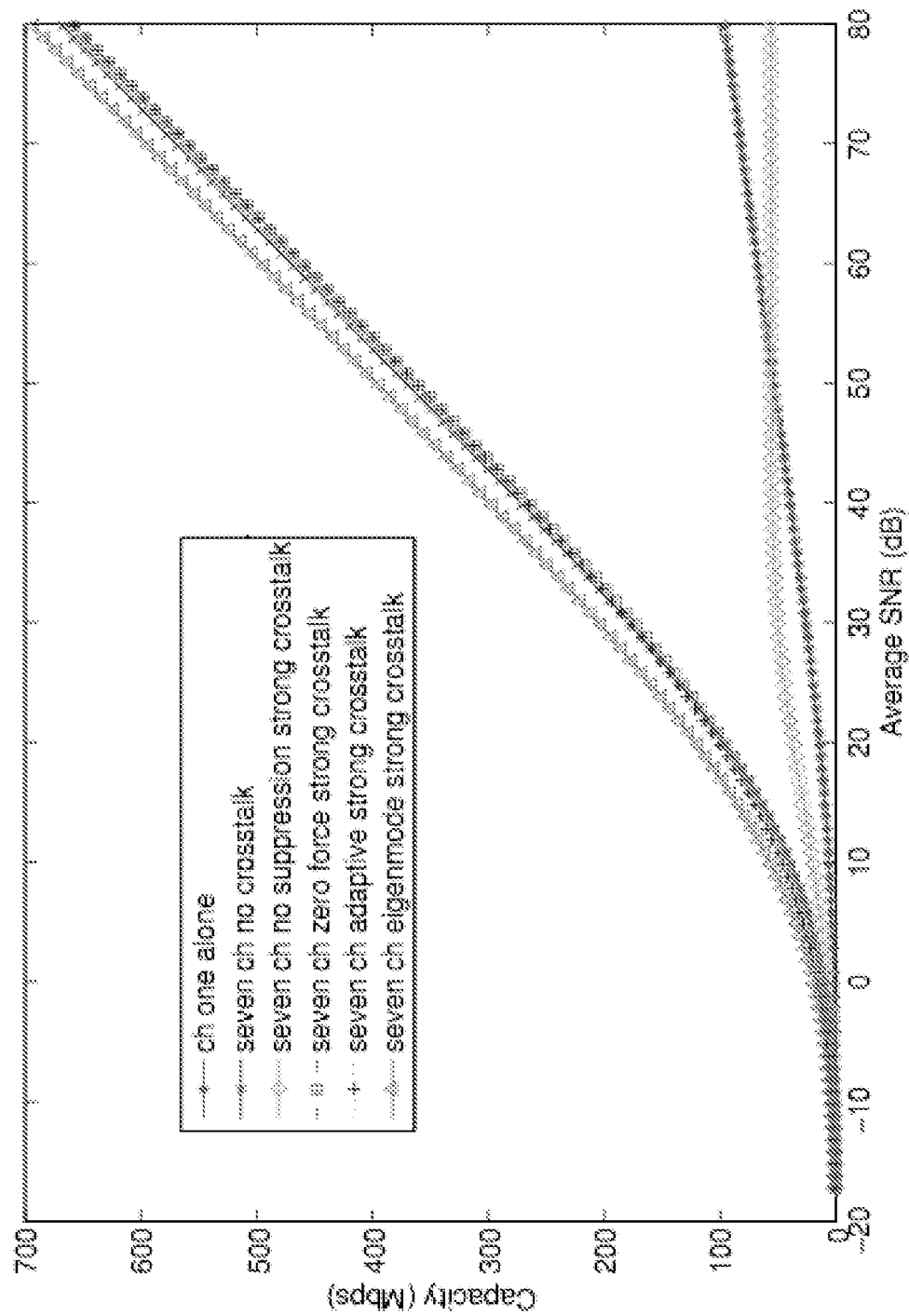
FIG. 19 is a graph of 7×7 MIMO acoustic-electric channel capacity comparison curves with strong crosstalk.

The expressions for SNR and SINR obtained previously were also used to determine the seven-channel capacity for the full OFDM signaling case. In this case, the crosstalk found from the channel measurements shown in FIG. 11 were used to compute the results. FIG. 18 shows the capacity performance results for various scenarios. FIG. 19 shows the capacity performance results for the same cases under relatively strong crosstalk. Here, the crosstalk values from the measurements were increased by 10 dB. It is assumed that the noise power is the same for all subcarriers on both physical channels. Due to the variation in signal attenuation, the SNR varies among the subcarriers. The plot uses average SNR on the horizontal axis.

The behavior for the various techniques in the 7 channel case is very similar to those for the same techniques in the 2 channel case. All the crosstalk mitigation techniques result in performance that is similar to that for independent channels without any crosstalk. FIG. 19 most clearly shows the relative performance of the crosstalk suppression techniques. Both the zero-forcing and MMSE approaches perform slightly worse than when transmission occurs on 7 channels without crosstalk. Eigenmode transmission provides slightly better performance than having 7 channels without crosstalk. The eigenmode transmission technique is fundamentally different than the other techniques since it modifies the transmitted signals. In doing so, the eigenmode structure allows the transmit power to be focused along the dominant eigenmodes of the aggregate channel, i.e. the channel formed by the 7 parallel channels and their crosstalk, causing the multiple-channel capacity to outperform even the maximum capacity of independent channels assuming no crosstalk. In a sense, eigenmode transmission is not a crosstalk suppression technique but more like an interference avoidance technique. Naturally, a drawback of eigenmode transmission is the need to feed information back to the transmitter to guide the changes in the transmitted signals. The zero-forcing and MMSE techniques, by comparison, are more aptly described as interference suppression techniques in that they operate on the receiver end only and work to suppress the interference between the signals that is introduced by the crosstalk.

In most cases, it appears that either the zero-forcing or MMSE approaches the better choice because of their relative simplicity and good performance. The MMSE approach, implemented as a decision-directed LMS system, has the advantage that it will automatically track the time variations of the channel, eliminating the need for explicit channel estimation. Note, however, that the trade-off may change slightly if the crosstalk gets much larger, as would be the case if smaller diameter transducers were used. Larger crosstalk yields higher maximum capacity for the eigenmode transmission structure due to the beam-forming effect. The maximum capacity of the zero forcing and MMSE will continue to decrease incrementally with increasing crosstalk magnitude. However, it should be noted that the maximum capacity performance gap between the LMS and zero forcing will tend to increase in favor of the LMS.

Bit-Loading

Figure 20:
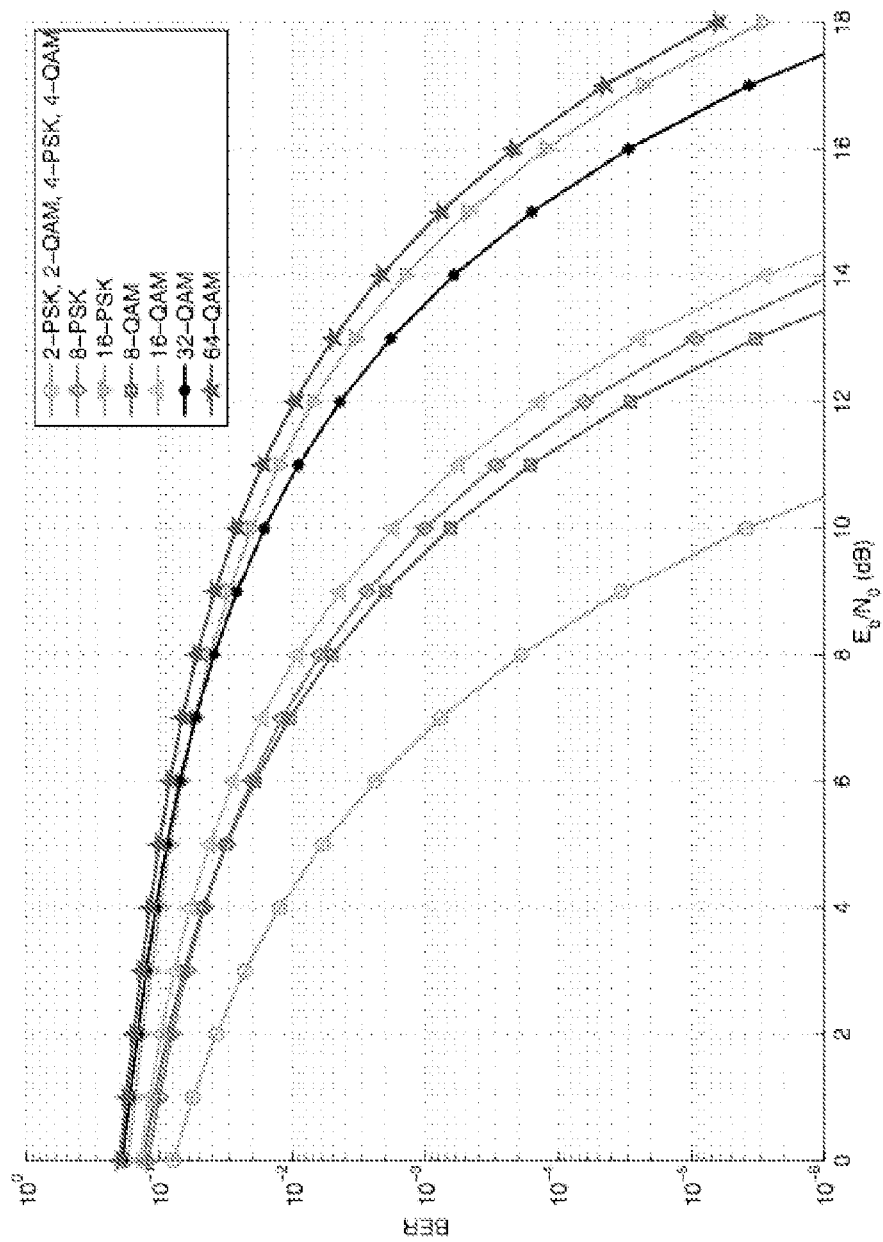
FIG. 20 is a graph of waterfall curves for various modulation types and levels.

The goal behind bit-loading is to use the highest order modulation on each OFDM subcarrier that will meet a target bit error rate (BER). Here the order of the modulation refers to the number of bits that are encoded in each transmitted symbol, e.g. 1 bit/symbol (binary), 2 bits/symbol (quaternary), 3 bits/symbol (8-ary), etc. By using bit-loading, information will be packed into the frequency selective, quasi-static channels in an efficient way. Bit-loading is one approach for trying to approach the performance given by the theoretical maximum capacity given earlier. With bit-loading, it is common to use modulation schemes such as phase-shift keying (PSK) and quadrature amplitude modulation (QAM) on the individual subcarriers. PSK encodes information by changing the phase of a signal while QAM uses both phase and amplitude to encode information. Waterfall curves showing BER versus the energy-per-bit to one-sided noise power spectral density, Eb/N0, for various modulation schemes are given in FIG. 20. These curves illustrate several important points. For a given modulation type, e.g. PSK, to support a higher order modulation level while maintaining a given target BER, a higher value of Eb/NO (i.e. SNR) level is required. Another point worth noting is that QAM can support higher modulation levels at a lower required SNR while still meeting the target BER. Thus, QAM should be used for higher modulation levels.

Given a target BER, the required SNR for Gray coded M-ary PSK and M-ary QAM may be calculated respectively as $$SNR_{M-PSK} = \frac{1}{2}\left[\frac{Q^{-1}\left(\frac{BER\log_2(M)}{2}\right)}{\sin\left(\frac{\pi}{M}\right)}\right]^2 \text{ and}$$

$$SNR_{M-QAM} = \left(\frac{M-1}{3}\right)\left[Q^{-1}\left(\frac{BER\log_2(M)}{4\left(1-\frac{1}{\sqrt{M}}\right)}\right)\right]^2.$$

$Q^{-1}$ where represents the inverse Q function.

Figure 21:
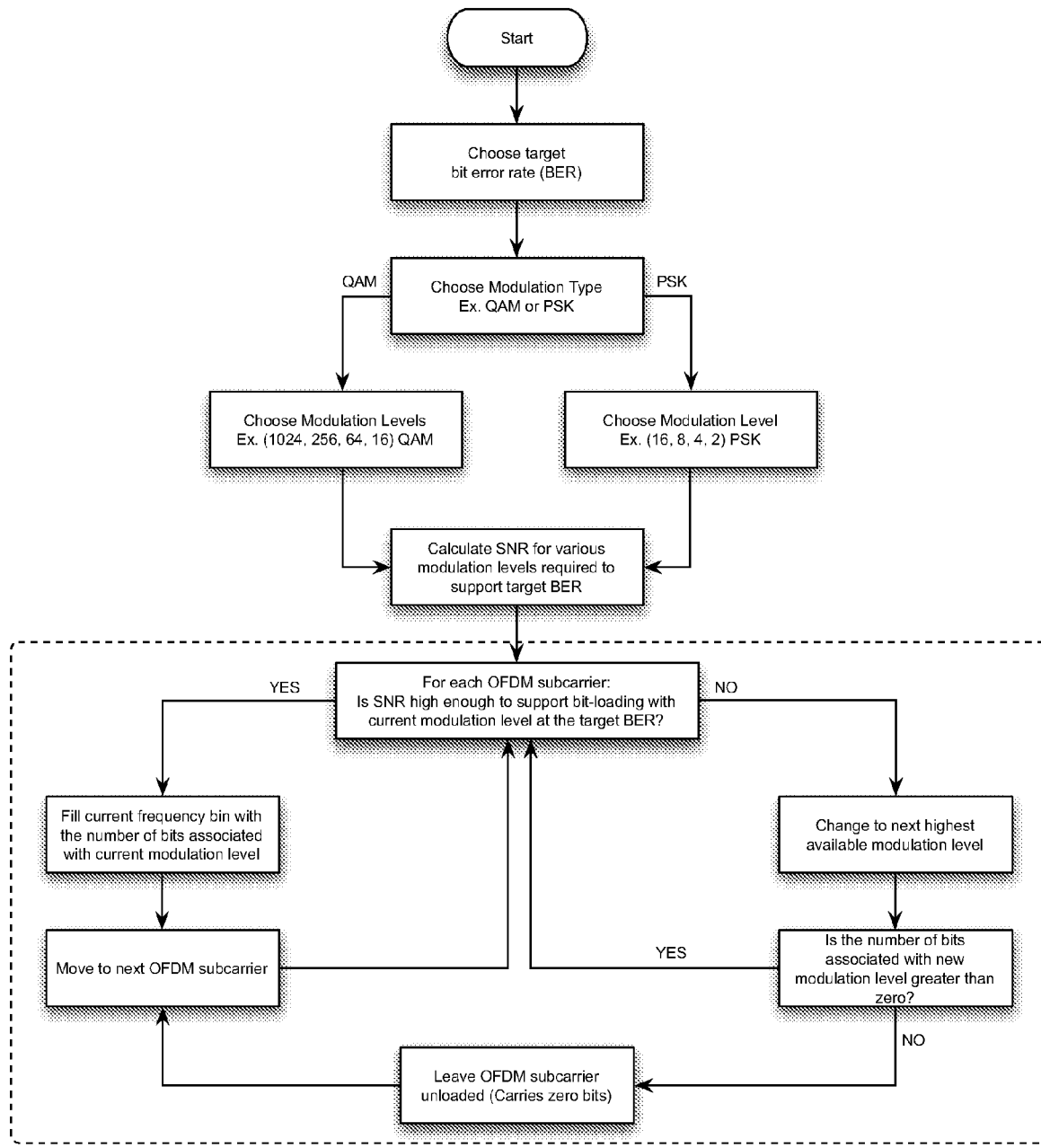
FIG. 21 is a block diagram of a bit-loading routine.
Figure 22:
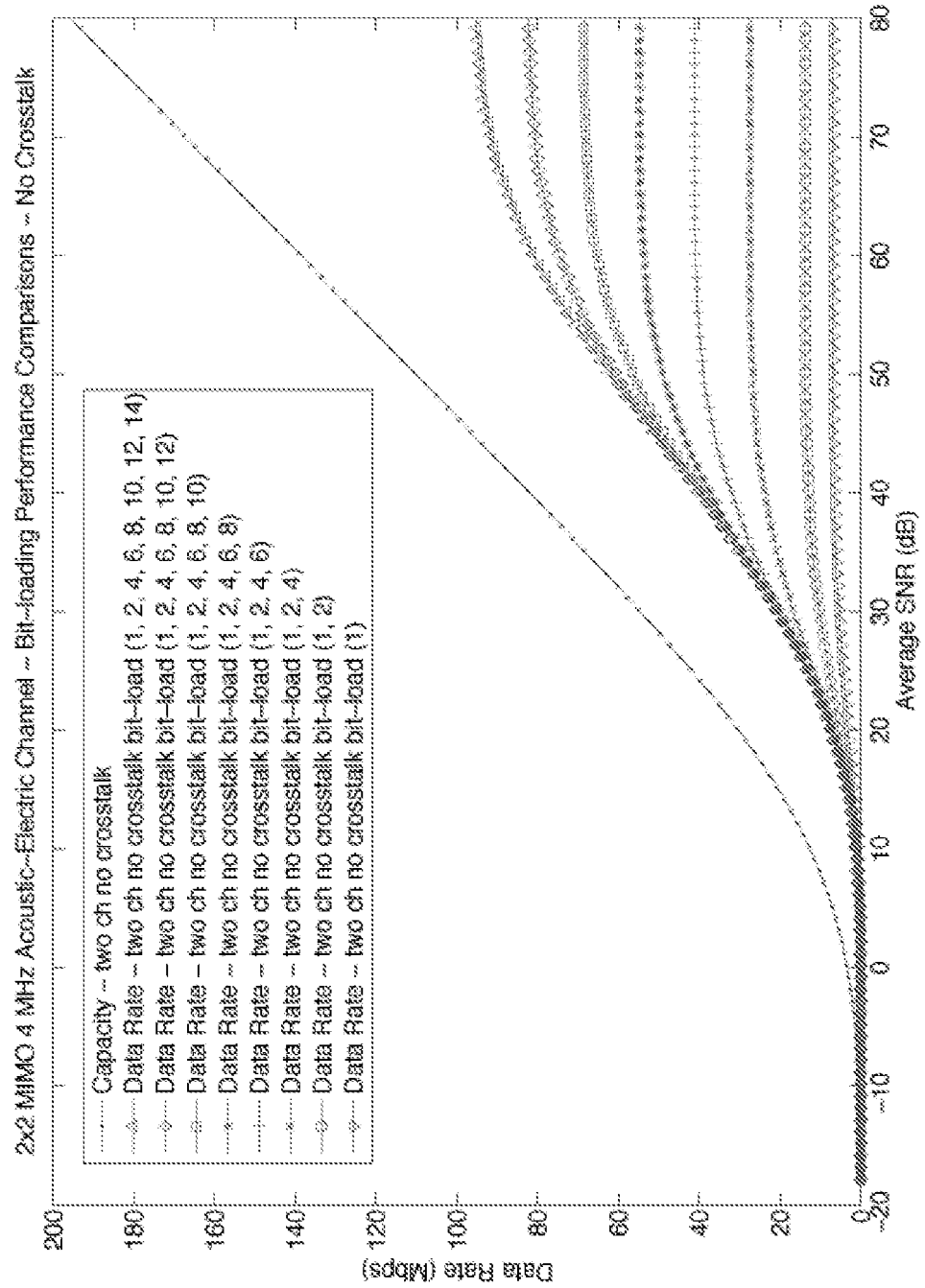
FIG. 22 is a graph comparing 2×2 MIMO bit-loading performances without crosstalk.
Figure 23:
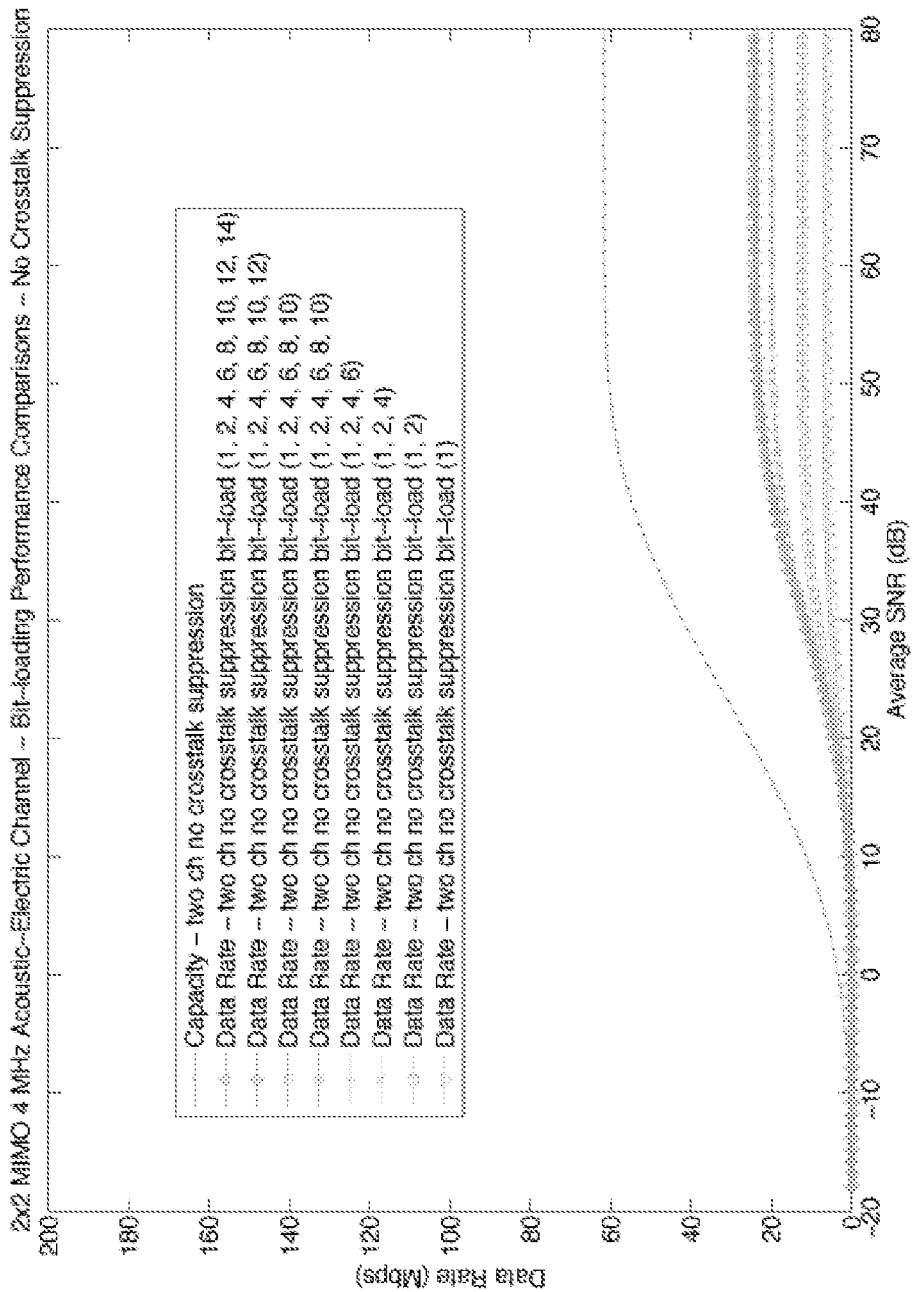
FIG. 23 is a graph comparing 2×2 MIMO bit-loading performances with crosstalk but no crosstalk suppression.
Figure 24:
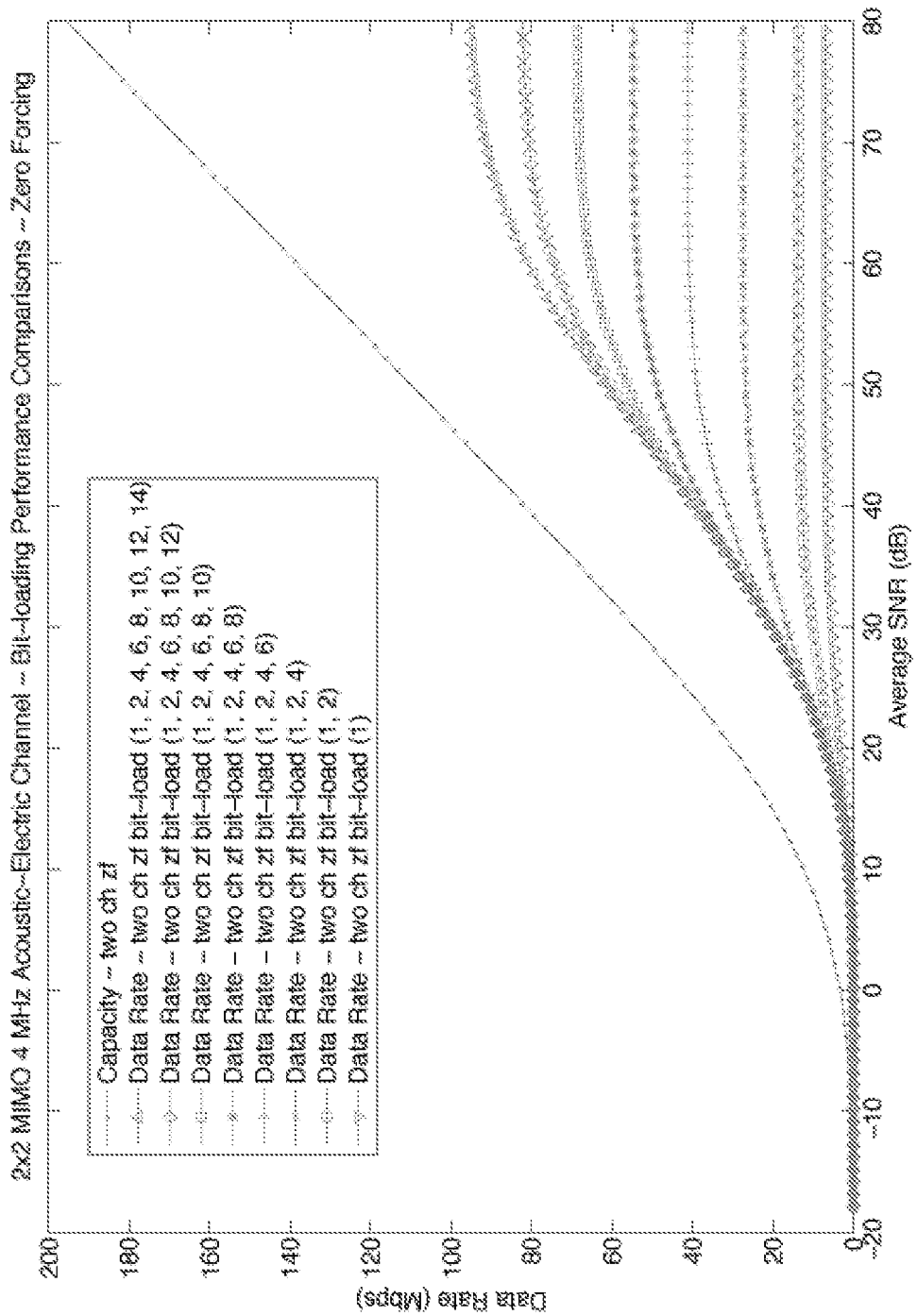
FIG. 24 is a graph comparing 2×2 MIMO bit-loading performances with crosstalk and zero-forcing crosstalk suppression.
Figure 25:
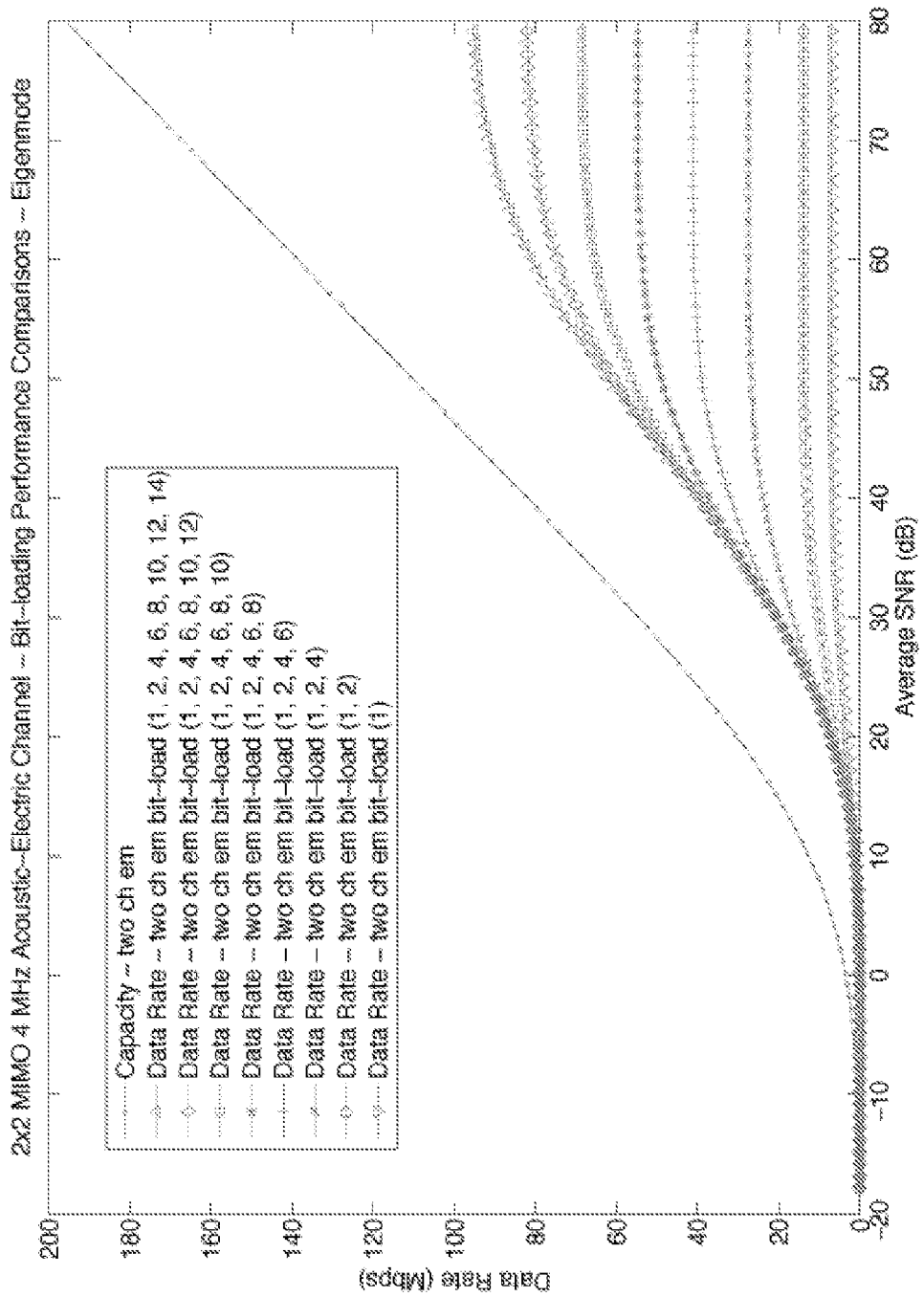
FIG. 25 is a graph comparing 2×2 MIMO bit-loading performances with crosstalk and eigenmode crosstalk suppression.
Figure 26:
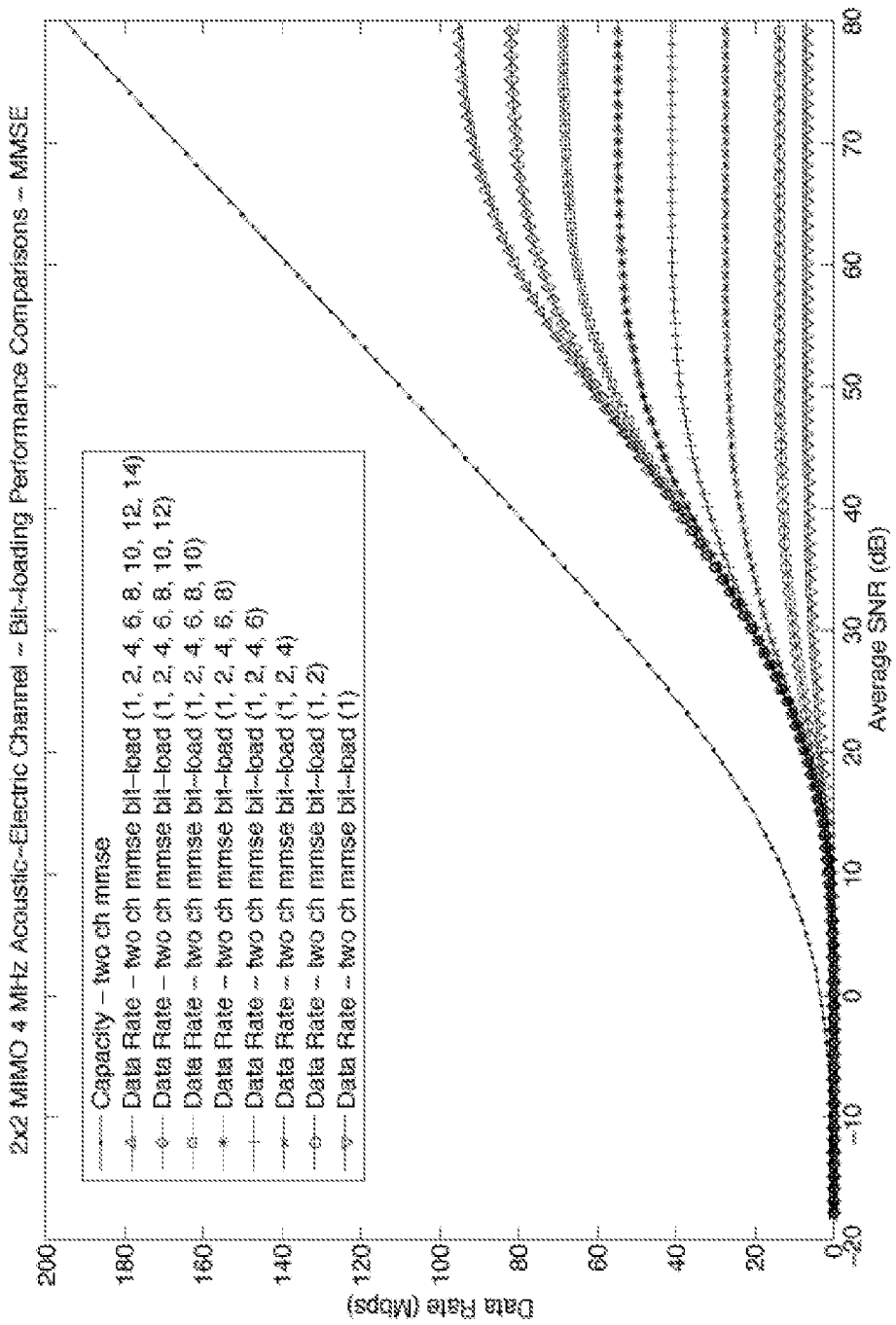
FIG. 26 is a graph comparing 2×2 MIMO bit-loading performances with crosstalk and minimum mean-square error (MMSE) crosstalk suppression.
Figure 27:
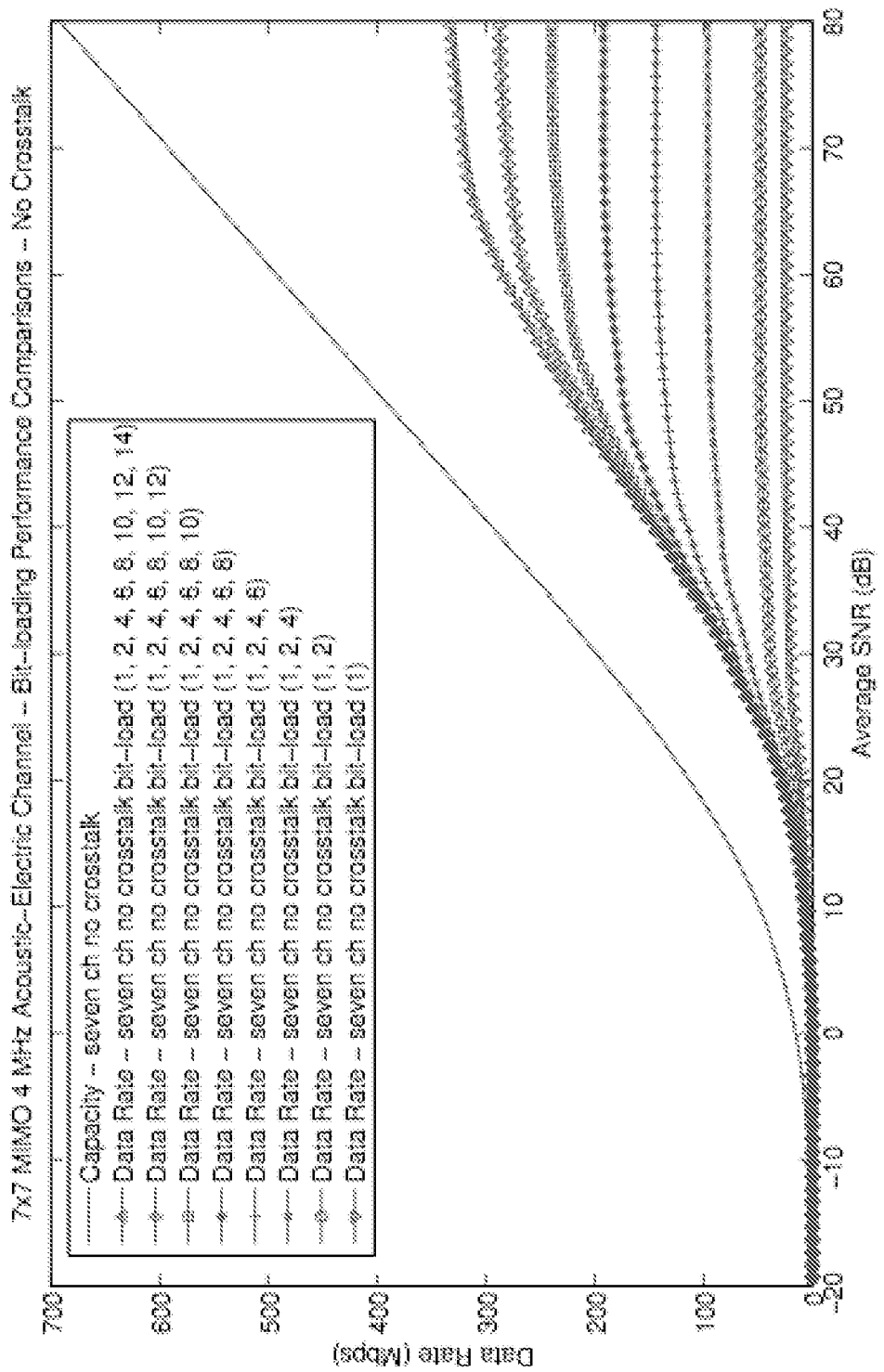
FIG. 27 is a graph comparing 7×7 MIMO bit-loading performances without crosstalk.
Figure 28:
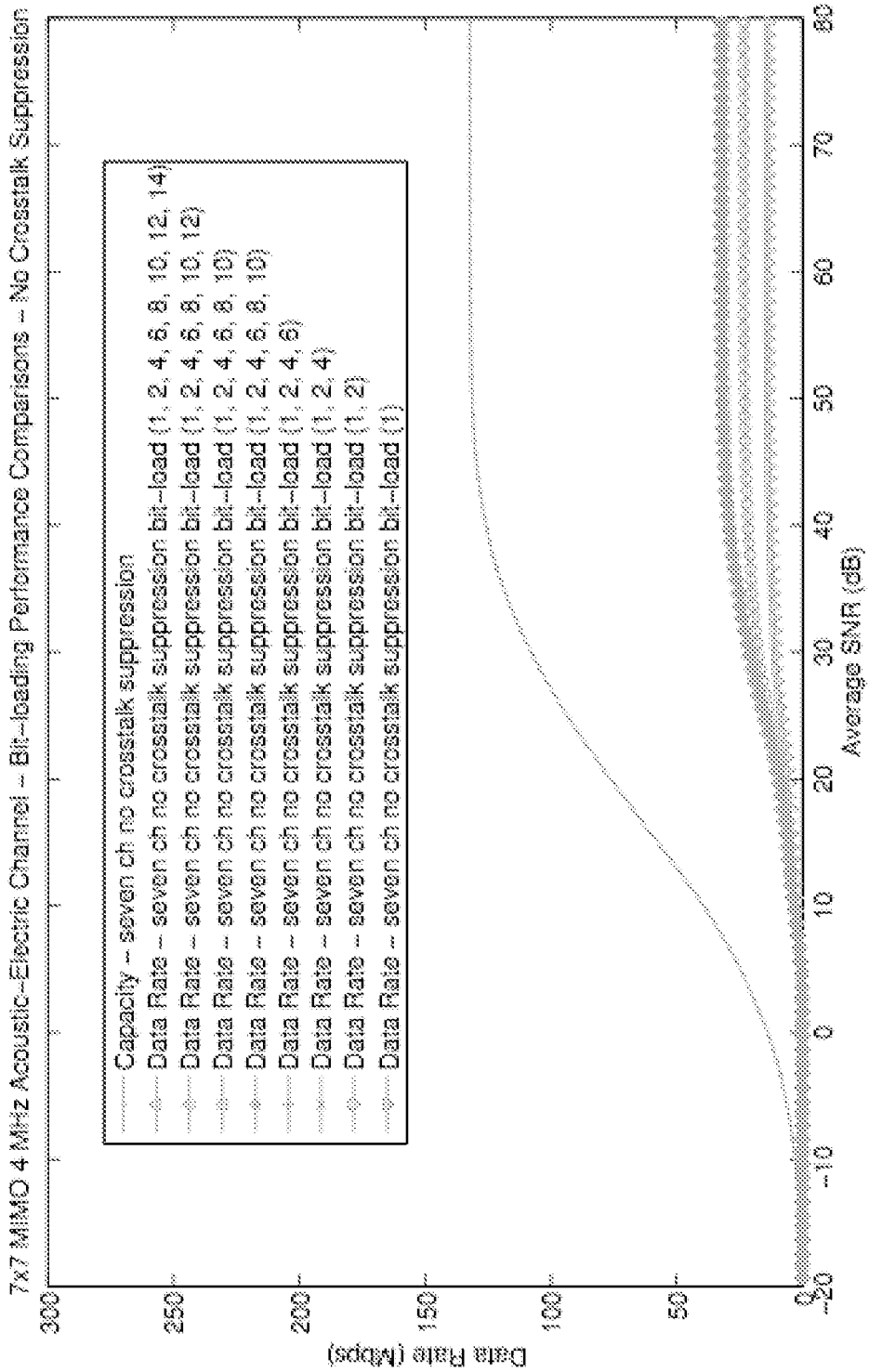
FIG. 28 is a graph comparing 7×7 MIMO bit-loading performances with crosstalk and without crosstalk suppression.
Figure 29:
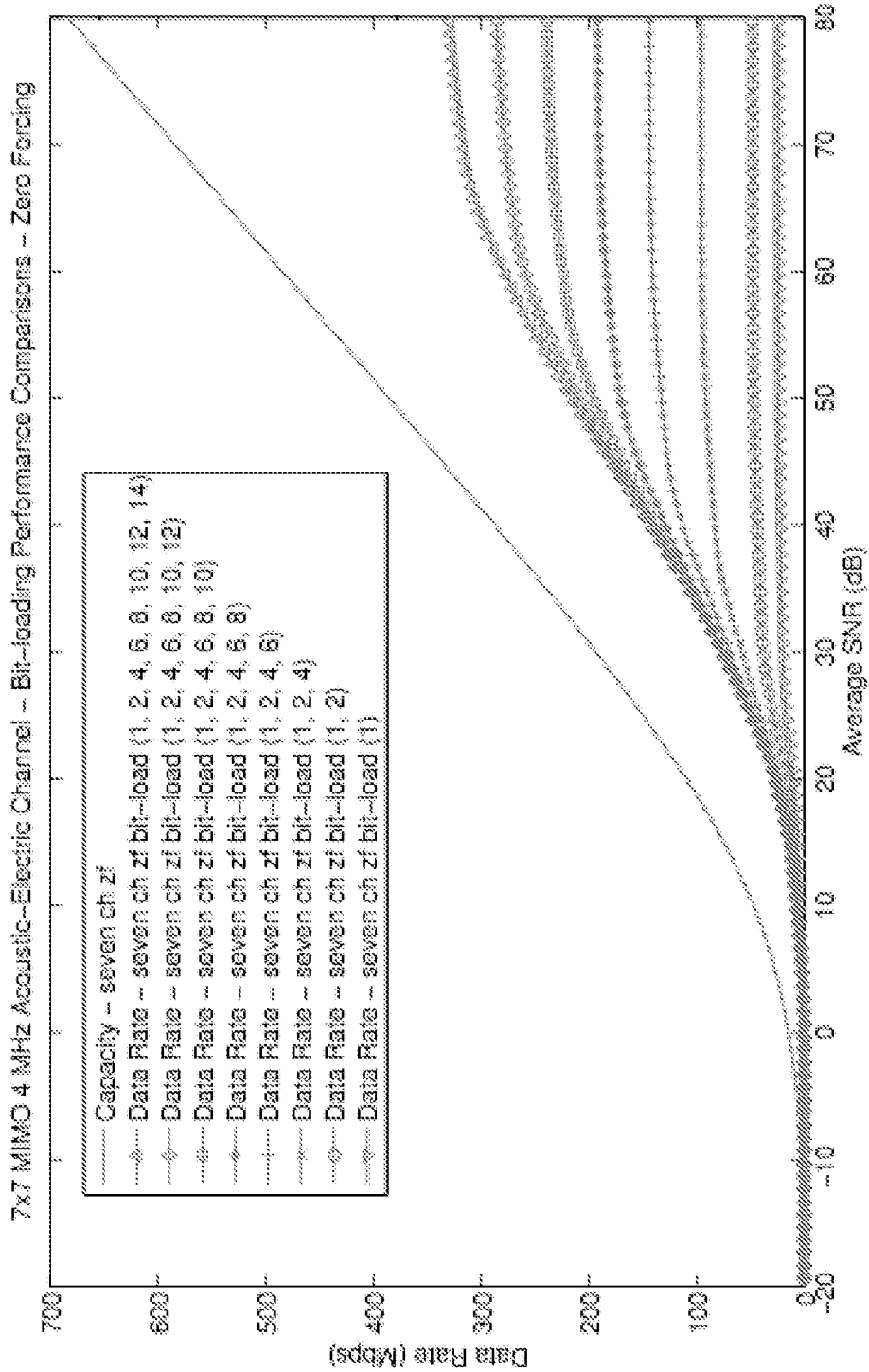
FIG. 29 is a graph comparing 7×7 MIMO bit-loading performances with crosstalk and using zero-forcing crosstalk suppression.
Figure 30:
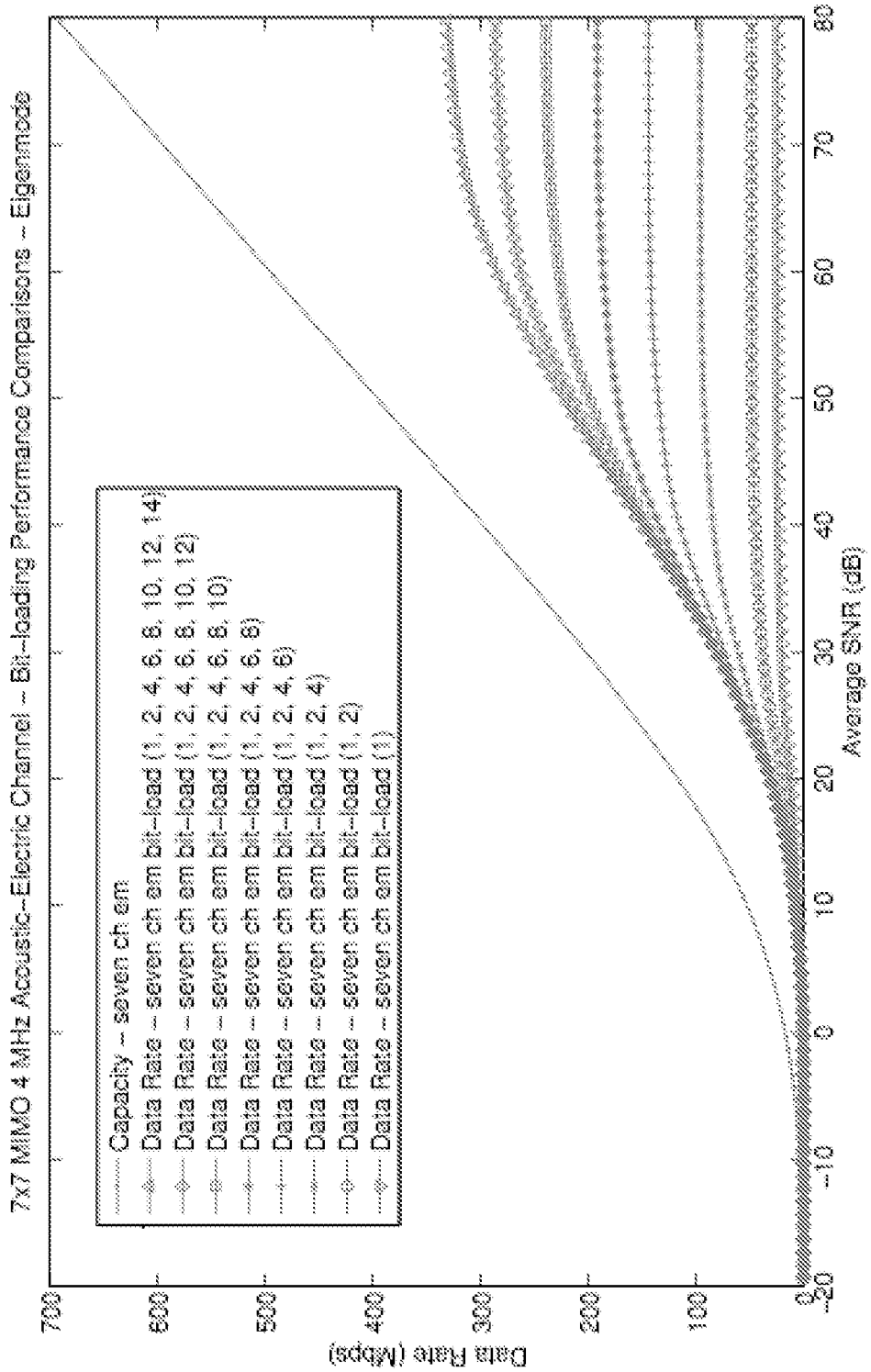
FIG. 30 is a graph comparing 7×7 MIMO bit-loading performances with crosstalk and using eigenmode crosstalk suppression.
Figure 31:
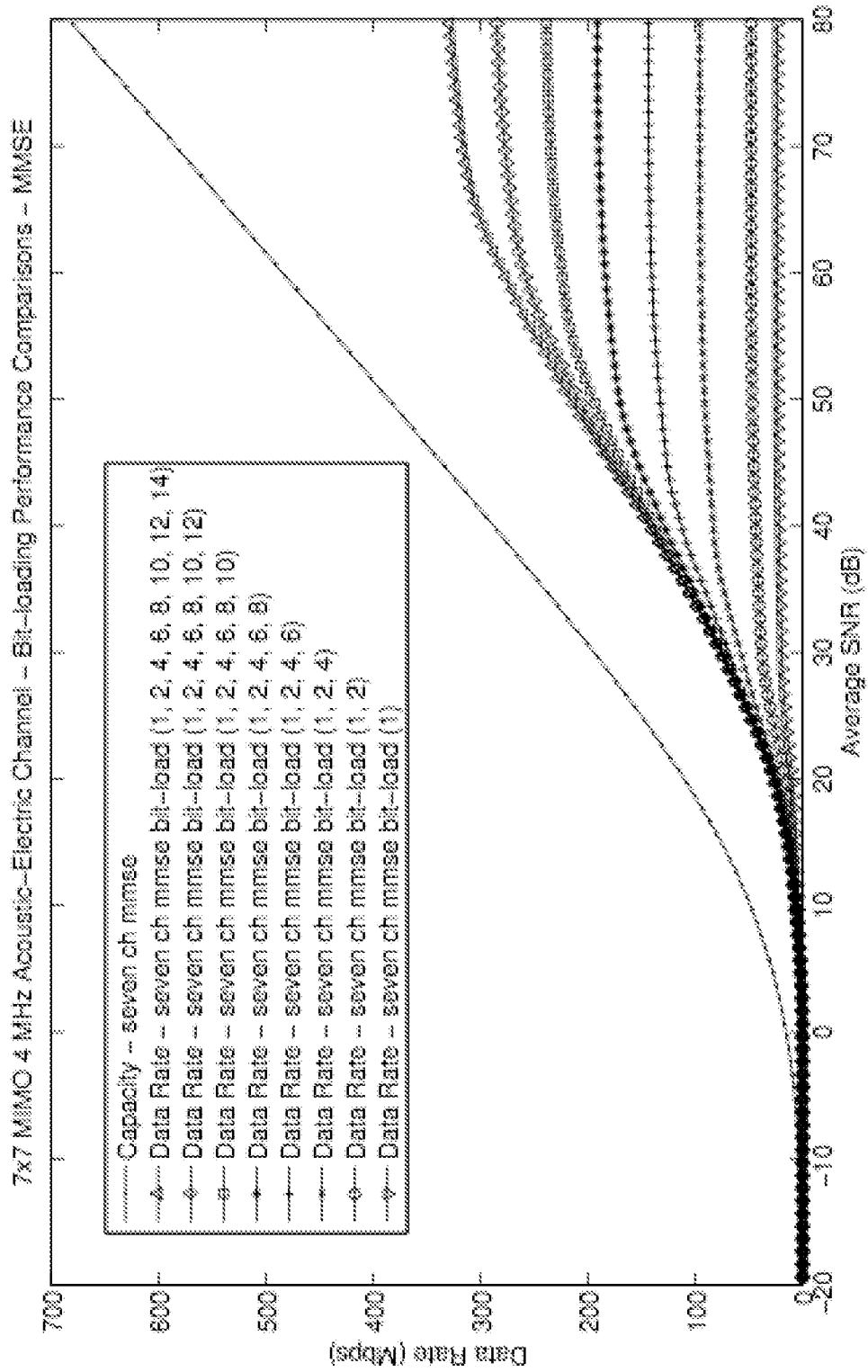
FIG. 31 is a graph comparing 7×7 MIMO bit-loading performances with crosstalk and using MMSE crosstalk suppression.

The transmitter and receiver must coordinate in order to perform bit loading, with the receiver feeding "side information" back to the transmitter that enables the transmitter to determine the appropriate modulation order to use for the SNR present on a particular subcarrier. In analyzing bit-loading performance it is generally assumed that a means for providing this side information is present, such as a communication link in the opposite direction, and that the transmitter has perfect (i.e. accurate) information regarding the SNR of the subcarrier channels. A block diagram illustrating the bit-loading process is given in FIG. 21.

The bit-loading results shown in this disclosure utilize a target BER of $10^{-6}$ and employ several modulation levels, comparing the performance against the benchmark provide by Shannon's Limit (i.e. the theoretical capacity). The following sections show the bit-loading performances for the two-channel and seven-channel cases.

Two-Channel Bit-Loading Performance Results

Several bit-loading combinations were investigated for the 2×2 MIMO 4 MHz acoustic-electric channel for a variety of cases. These include no crosstalk, no crosstalk suppression, zero forcing, eigenmode transmission, and MMSE, and the results are summarized in FIG. 22 to FIG. 26, respectively. In each case, the bit-loading results for several modulation order combinations are compared to the Shannon Limit. The quantities in the parentheses of the figure legends show numbers denoting the number of bits per symbol carried by the QAM modulation scheme. The order of QAM may thus be found by taking $2^{\#Bits}$. For example, the digits corresponding to 1, 2, 4, 6, 8, 10, 12, and 14 correspond to (2, 4, 16, 64, 256, 4096, and 16384)-QAM, respectively. When multiple values are given, the bit-loading algorithm selected from that set but choosing the highest order modulation that could be supported for each subcarrier for a BER of $10^{-6}$ or less.

Several interesting observations may be derived from the 2×2 bit-loading figures. Observing FIG. 23, it is apparent that increasing the highest modulation level has little effect on increasing the data rate as SNR is increased. This is due to the fact that, at higher SNR, the performance of the multi-channel configuration becomes limited by crosstalk (interference). Thus, the average SNR per subcarrier will not be high enough to support a higher modulation level. The other figures illustrate the favorable performance through the utilization of crosstalk cancellation structures. Once the crosstalk is cancelled, many of the OFDM bins have high enough SNR to support the highest modulation scheme and can be filled with the corresponding number of bits, resulting in a significant data rate increase. As average SNR increases, there is a trend showing diminishing marginal returns in data rate performance. This is due to the fact that there are a fixed number of OFDM bins (e.g. 4096) and as more and more get filled with the highest possible modulation level, eventually all of them are filled with the highest possible level and the data rate performance is thus saturated. The only way to achieve a higher rate at this point would be to employ an even higher modulation level. Note also that the bit-loading performance does not equal the theoretical capacity since bit-loading is a good, but sub-optimal loading scheme.

Seven-Channel Bit-Loading Performance Results

Several bit-loading combinations were investigated for the 7×7 MIMO 4 MHz acoustic-electric channel for a variety of cases. These include no crosstalk, no crosstalk suppression, zero forcing, eigenmode transmission, and MMSE, and the results are summarized in FIG. 27 to FIG. 31. In each case, the bit-loading results for several modulation order combinations are compared to the Shannon Limit. The quantities in the parentheses of the figure legends show numbers denoting the number of bits per symbol carried by the QAM modulation scheme. The level of QAM may thus be found by taking $2^{\#Bits}$. For example, the digits corresponding to 1, 2, 4, 6, 8, 10, 12, and 14 correspond to (2, 4, 16, 64, 256, 4096, and 16384)-QAM, respectively. The performance trends for this 7×7 case are very similar to those for the 2×2 case.

Power-Allocation

For a given OFDM bin and target BER, the subchannel SNR may either be greater than, equal to, or less than that required to support the highest available modulation order. In situations where the actual SNR is greater than or equal to that required to support the highest available modulation level, bit-loading techniques simply fill the bin with this modulation level. Power-allocation techniques, however, reduce the symbol energy on a given bin to exactly the level required to meet the target BER performance, and re-allocate the saved energy to OFDM bins having SNR levels that do not meet the required level. In this way, additional bins may be brought up to the required level to meet the target BER performance. Such a power-allocation scheme results in further optimization of data rates and lends very well to the quasi-static acoustic-electric channels. This technique is denoted as power-loading and the optimal solution to the power allocation is the water filling solution. Using power loading along with the interference mitigation techniques described in this disclosure will further improve performance, yielding results closer to the theoretical maximum capacity.

Misaligned Transducer Arrays

Throughout this disclosure, we have considered the case in which the transmit and receive transducers are co-axially aligned on either side of the wall. The performance of the zero-forcing and MMSE crosstalk mitigation techniques will degrade with significant misalignment between the transmit and receive transducer pairs. With eigenmode transmission, however, the system does not use physical channel pairs but, instead, uses the modes of the system formed by the coupled transmit and receive arrays as communication channels. As a result, communication modes will exist without co-axial alignment between transmit/receive transducer pairs and, in many cases such as a rotational misalignment of the array in FIG. 10, i.e. a rotation of either the transmit array with respect to the receive array, will not significantly degrade performance. Translational misalignment which results in a significant fraction of the transmit power not reaching the receive array will, however, result in significant performance loss.

CONCLUSIONS

In this disclosure, we presented a multicarrier multichannel data communication system. Utilizing two or more closely spaced co-axially aligned transmitter-receiver pairs mounted on opposing sides of a thick metallic barrier, channel data was collected to determine the direct and interfering channel gains. It was determined that crosstalk does limit increases in capacity over the single channel case even as the SNR is increased toward infinity. However, utilizing interference mitigation structures including zero forcing, eigenmode, and MMSE techniques yielded multiple-channel capacity performance which approximately scales with the number of channels. Also, it was noted that significant increases in receiver complexity yield only marginal increases in capacity. Thus, a simple decision directed interference cancellation approach such as the LMS seems to be the preferred method when considering performance and complexity on the relatively static acoustic-electric MIMO channel.

While specific embodiments of the invention have been shown and described in detail to illustrate the application of the principles of the invention, it will be understood that the invention may be embodied otherwise without departing from such principles.

What is claimed is:

1. A method of sending signals through a barrier using multiple-input multiple-output (MIMO) channels comprising transducers and zero forcing crosstalk suppression, the method comprising the steps of:
providing a barrier, the barrier having a transmitter assembly on a first side of the barrier and a receiver assembly on a second side of the barrier;
wherein the transmitter assembly comprises a plurality of transmit transducers coupled to the first side of the barrier;
wherein the receiver assembly comprises a plurality of receiver transducers coupled to the second side of the barrier;
wherein equal numbers of the transmit transducers and the receiver transducers are provided, and wherein each transmit transducer is paired with and axially aligned with a corresponding receiver transducer on the opposite side of the barrier;
providing a plurality of communication channels for communicating the signals through the barrier, wherein each said communication channel comprises a portion of the barrier which is located between said paired and axially aligned transmit and receiver transducers, wherein the number of communication channels is the same as the number of transmit transducer and receiver transducer pairs, and wherein two or more of the communication channels collectively form part of a MIMO signaling arrangement;
sending a transmit signal from the first side of the barrier through at least one communication channel using at least one transmit transducer;
wherein the step of sending the transmit signal from the first side of the barrier through the communication channels comprises using orthogonal frequency division multiplexing (OFDM); and
wherein using OFDM comprises sending the signals on a plurality of subcarriers;
receiving a receive signal vector at the receiver transducers;
determining a channel gain matrix H for the plurality of communication channels which are part of the MIMO signaling arrangement;
using zero forcing to cancel crosstalk within the MIMO signaling arrangement, wherein the step of using the zero forcing comprises scaling the receive signal vector with the inverse of the channel gain matrix H.

2. The method of claim 1, wherein the step of determining the channel gain matrix H comprises the steps of:
the transmitter assembly transmitting known symbols on each subcarrier; and
the receiver assembly detecting the gain caused by each known symbol transmission at the plurality of receiver transducers.

3. The method of claim 1, wherein the step of determining the channel gain matrix H is repeated over time in order to track changes in a signal gain over time.

4. The method of claim 1, wherein the plurality of subcarriers are modulated using phase key shifting (PSK).

5. The method of claim 1, wherein the plurality of subcarriers are modulated using quadrature amplitude modulation (QAM).

6. The method of claim 1, wherein the data rate of the MIMO signaling arrangement is at least as great as the combined total data rates of the plurality of communications channels if each communication channel is instead used individually.

7. The method of claim 1, wherein the step of sending the transmit signal through the communication channels comprises using bit-loading;
wherein the bit-loading is implemented by the transmitter assembly and the receiver assembly;
wherein the receiver assembly provides receiver side information, including information regarding subcarrier signal to noise ratios, to the transmitter assembly; and
wherein the transmitter assembly uses the receiver side information to determine a modulation level for use with each of the plurality of subcarriers.

8. The method of claim 7, wherein the bit-loading implementation further comprises the steps of:
choosing a target bit error rate (BER);
choosing a modulation type;
choosing at least one modulation level;
calculating a target minimum signal to noise ratio (SNR) required to achieve the target bit error rate for a plurality of modulation levels; and
for each OFDM subcarrier, determining whether a first modulation level results in a SNR high enough to support the bit-loading without exceeding the target bit error rate, and if the SNR is not satisfactory trying a higher modulation level, and if the SNR level is satisfactory filling a current frequency bin with a number of bits associated with the first modulation level.

9. A method of sending signals through a barrier using multiple-input multiple-output (MIMO) channels comprising transducers and eigenmode transmission, the method comprising the steps of:
providing a barrier, the barrier having a transmitter assembly on a first side of the barrier and a receiver assembly on a second side of the barrier;
wherein the transmitter assembly comprises a plurality of transmit transducers coupled to the first side of the barrier;
wherein the receiver assembly comprises a plurality of receiver transducers coupled to the second side of the barrier;
wherein equal numbers of the transmit transducers and the receiver transducers are provided, and wherein each transmit transducer is paired with and axially aligned with a corresponding receiver transducer on the opposite side of the barrier;
providing a plurality of communication channels for communicating the signals through the barrier, wherein each communication channel comprises a portion of the barrier which is located between said paired and axially aligned transmit and receiver transducers, wherein the number of communication channels is the same as the number of transmit transducers and the number of receiver transducers, and wherein two or more of the communication channels collectively form a MIMO signaling arrangement;
providing a transmit signal vector x;
multiplying the transmit signal vector x by a precoding matrix to produce a linearly transformed input vector;
transmitting the linearly transformed input vector from the first side of the barrier through the barrier using the MIMO signaling arrangement, wherein the communication channels making up the MIMO signaling arrangement are mathematically represented by a channel gain matrix H;
wherein the step of transmitting the linearly transformed input vector from the first side of the barrier through the barrier comprises using orthogonal frequency division multiplexing (OFDM); and
wherein using OFDM comprises sending the signals on a plurality of subcarriers;
the receiver assembly receiving the linearly transformed input vector as a received signal vector at the second side of the barrier; and
shaping the received signal vector by performing a linear transformation on the received signal vector using a receiver shaping matrix and thereby producing an output signal vector.

10. The method of claim 9, wherein the plurality of subcarriers are modulated using phase key shifting (PSK).

11. The method of claim 9, wherein the plurality of subcarriers are modulated using quadrature amplitude modulation (QAM).

12. The method of claim 9, wherein the data rate of the MIMO signaling arrangement is at least as great as the combined total data rates of the plurality of communications channels if each communication channel is instead used individually.

13. The method of claim 9, further comprising using bit-loading;
wherein the bit-loading is implemented by the transmitter assembly and the receiver assembly;
wherein the receiver assembly provides receiver side information, including information regarding subcarrier signal to noise ratios, to the transmitter assembly; and
wherein the transmitter assembly uses the receiver side information to determine a modulation level for use with each of the plurality of subcarriers.

14. The method of claim 13, wherein the bit-loading implementation further comprises the steps of:
choosing a target bit error rate (BER);
choosing a modulation type;
choosing at least one modulation level;
calculating a target minimum signal to noise ratio (SNR) required to achieve the target bit error rate for a plurality of modulation levels; and
for each OFDM subcarrier, determining whether a first modulation level results in a satisfactory signal-to-noise ratio (SNR); and
if the SNR is not satisfactory, choosing a second modulation level higher than the first modulation level;
wherein the SNR is considered satisfactory if it is high enough to support the bit-loading without exceeding the target bit error rate.

15. The method of claim 9, further comprising deriving at least one decision variable from the output signal vector.

16. A method of sending signals through a barrier using multiple-input multiple-output (MIMO) channels comprising transducers and using minimum mean-squared error (MMSE) crosstalk suppression, the method comprising the steps of:
providing a barrier, the barrier having a transmitter assembly on a first side of the barrier and a receiver assembly on a second side of the barrier;
wherein the transmitter assembly comprises a plurality of transmit transducers coupled to the first side of the barrier;
wherein the receiver assembly comprises a plurality of receiver transducers coupled to the second side of the barrier;
wherein equal numbers of the transmit transducers and the receiver transducers are provided, and wherein each transmit transducer is paired with and axially aligned with a corresponding receiver transducer on the opposite side of the barrier;
providing a plurality of communication channels for communicating the signals through the barrier, wherein each communication channel comprises a portion of the barrier which is located between said paired and axially aligned transmit and receiver transducers, wherein the number of communication channels is the same as the number of transmit transducer and receiver transducer pairs, and wherein a plurality of the communication channels collectively form a MIMO signaling arrangement;
sending a transmit signal vector from the first side of the barrier through at least one communication channel using at least one transmit transducer;
wherein the step of transmitting the linearly transformed input vector from the first side of the barrier through the barrier comprises using orthogonal frequency division multiplexing (OFDM); and
wherein using OFDM comprises sending the signals on a plurality of subcarriers;
receiving a receive signal vector at the receiver transducers;

determining a weight matrix W for the plurality of communication channels which are part of the MIMO signaling arrangement; and using minimum mean-squared error processing to cancel crosstalk within the MIMO signaling arrangement, wherein the step of using the minimum mean-squared error processing to cancel crosstalk comprises scaling the receive signal vector with the weight matrix W.

17. The method of claim 16, wherein the weight matrix W is updated over time.

18. The method of claim 16, wherein a step for updating the weight matrix W comprises determining an error vector by comparing the transmit signal vector with the result of scaling the receive signal vector with the weight matrix W.

19. The method of claim 16, wherein the plurality of subcarriers are modulated using phase key shifting (PSK).

20. The method of claim 16, wherein the plurality of subcarriers are modulated using quadrature amplitude modulation (QAM).

21. The method of claim 16, wherein the data rate of the MIMO signaling arrangement is at least as great as the combined total data rates of the plurality of communications channels if each communication channel is instead used individually.

22. The method of claim 16, wherein the step of sending the transmit signal through the communication channels comprises using bit-loading;

wherein the bit-loading is implemented by the transmitter assembly and the receiver assembly;

wherein the receiver assembly provides receiver side information, including information regarding subcarrier signal to noise ratios, to the transmitter assembly; and wherein the transmitter assembly uses the receiver side information to determine a modulation level for use with each of the plurality of subcarriers.

23. The method of claim 22, wherein the bit-loading implementation further comprises the steps of:

choosing a target bit error rate (BER);
choosing a modulation type;
choosing at least one modulation level;
calculating a target minimum signal to noise ratio (SNR) required to achieve the target bit error rate for a plurality of modulation levels; and
for each OFDM subcarrier, determining whether a first modulation level results in a SNR high enough to support the bit-loading without exceeding the target bit error rate, and if the SNR is not satisfactory trying a higher modulation level, and if the SNR level is satisfactory filling a current frequency bin with a number of bits associated with the first modulation level.

24. A method of sending signals through a barrier using multiple-input multiple-output (MIMO) channels comprising transducers and crosstalk suppression, the method comprising the steps of:

providing a barrier, the barrier having a transmitter assembly on a first side of the barrier and a receiver assembly on a second side of the barrier;

wherein the transmitter assembly comprises a plurality of transmit transducers coupled to the first side of the barrier;

wherein the receiver assembly comprises a plurality of receiver transducers coupled to the second side of the barrier;

wherein equal numbers of the transmit transducers and the receiver transducers are provided, and wherein each transmit transducer is paired with and axially aligned with a corresponding receiver transducer on the opposite side of the barrier;

providing a plurality of communication channels for communicating signals through the barrier, wherein each communication channel comprises a portion of the barrier which is located between said paired and axially aligned transmit and receiver transducers, wherein the number of communication channels is the same as the number of transmit transducer and receiver transducer pairs, and wherein two or more of the communication channels collectively form part of a MIMO signaling arrangement;

sending a transmit signal from the first side of the barrier through at least one communication channel using at least one transmit transducer;

wherein the step of transmitting the linearly transformed input vector from the first side of the barrier through the barrier comprises using orthogonal frequency division multiplexing (OFDM); and wherein using OFDM comprises sending the signals on a plurality of subcarriers;

receiving a receive signal vector at the receiver transducers; and reducing cross-talk among the transmit and receive signals.

25. The method of claim 24, wherein the reducing of crosstalk among the transmit and receive signals is achieved by at least one of: zero forcing; eigenmode transmission; and minimum mean-square error.

\* \* \* \* \*